US008893079B2

(12) United States Patent
Gschwind et al.

(10) Patent No.: US 8,893,079 B2
(45) Date of Patent: *Nov. 18, 2014

(54) METHODS FOR GENERATING CODE FOR AN ARCHITECTURE ENCODING AN EXTENDED REGISTER SPECIFICATION

(75) Inventors: Michael Karl Gschwind, Chappagua, NY (US); Robert Kevin Montoye, New York, NY (US); Brett Olsson, Cary, NC (US); John-David Wellman, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 23 days.

This patent is subject to a terminal disclaimer.

(21) Appl. No.: 13/559,334

(22) Filed: Jul. 26, 2012

(65) Prior Publication Data
US 2012/0297171 A1    Nov. 22, 2012

Related U.S. Application Data

(63) Continuation of application No. 12/062,057, filed on Apr. 3, 2008, now Pat. No. 8,312,424, which is a continuation of application No. 11/446,031, filed on Jun. 2, 2006, now abandoned.

(60) Provisional application No. 60/707,572, filed on Aug. 12, 2005.

(51) Int. Cl.
| | |
|---|---|
| *G06F 9/44* | (2006.01) |
| *G06F 9/45* | (2006.01) |
| *G06F 15/00* | (2006.01) |
| *G06F 7/38* | (2006.01) |
| *G06F 9/00* | (2006.01) |

(52) U.S. Cl.
CPC ................................. *G06F 8/447* (2013.01)
USPC .......... 717/105; 717/140; 717/151; 717/153; 712/226

(58) Field of Classification Search
None
See application file for complete search history.

(56) References Cited

U.S. PATENT DOCUMENTS

| | | | | |
|---|---|---|---|---|
| 5,249,295 | A | * | 9/1993 | Briggs et al. ................... 717/157 |
| 5,386,563 | A |   | 1/1995 | Thomas |
| 5,684,994 | A | * | 11/1997 | Tanaka et al. ................. 717/153 |
| 5,737,625 | A |   | 4/1998 | Jaggar |
| 5,768,574 | A |   | 6/1998 | Dutton et al. |
| 5,809,273 | A | * | 9/1998 | Favor et al. .................... 712/210 |
| 5,822,778 | A | * | 10/1998 | Dutton et al. ................. 711/208 |
| 5,838,984 | A |   | 11/1998 | Nguyen et al. |
| 5,890,000 | A | * | 3/1999 | Aizikowitz et al. ........... 717/154 |
| 5,903,919 | A | * | 5/1999 | Myers ............................ 711/220 |
| 5,905,893 | A | * | 5/1999 | Worrell ......................... 717/151 |

(Continued)

OTHER PUBLICATIONS

R. H. Dennard et al., in "Design of Ion-Implanted MOSFET's with Very Small Physical Dimensions," IEEE Journal of Solid-State Circuits, SC-9, pp. 256-268, 1974.

(Continued)

*Primary Examiner* — Charles Swift
(74) *Attorney, Agent, or Firm* — Tutunjian & Bitetto, P.C.; Vazken Alexanian

(57) ABSTRACT

There are provided methods and computer program products for generating code for an architecture encoding an extended register specification. A method for generating code for a fixed-width instruction set includes identifying a non-contiguous register specifier. The method further includes generating a fixed-width instruction word that includes the non-contiguous register specifier.

9 Claims, 19 Drawing Sheets

(56) References Cited

U.S. PATENT DOCUMENTS

| | | | |
|---|---|---|---|
| 5,926,646 A | | 7/1999 | Pickett et al. |
| 5,946,491 A | * | 8/1999 | Aizikowitz et al. ............ 717/158 |
| 6,014,739 A | * | 1/2000 | Christie ........................ 712/228 |
| 6,090,156 A | * | 7/2000 | MacLeod ...................... 717/157 |
| 6,154,832 A | | 11/2000 | Maupin |
| 6,157,996 A | * | 12/2000 | Christie et al. ................ 712/218 |
| 6,457,173 B1 | * | 9/2002 | Gupta et al. ................... 717/149 |
| 6,732,257 B1 | * | 5/2004 | Sheaffer ........................ 712/210 |
| 6,839,828 B2 | | 1/2005 | Gschwind et al. |
| 7,111,125 B2 | * | 9/2006 | Hooker ......................... 711/137 |
| 7,188,215 B2 | * | 3/2007 | Hooker ......................... 711/118 |
| 7,421,566 B2 | * | 9/2008 | Gschwind et al. ............. 712/216 |
| 7,793,081 B2 | * | 9/2010 | Gschwind et al. ............. 712/216 |
| 8,166,281 B2 | * | 4/2012 | Gschwind et al. ............. 712/216 |
| 2003/0188130 A1 | * | 10/2003 | Henry et al. ................... 712/209 |
| 2003/0188138 A1 | * | 10/2003 | Stansfield et al. ............. 712/221 |
| 2004/0015901 A1 | * | 1/2004 | Koseki et al. ................. 717/140 |
| 2004/0030863 A1 | * | 2/2004 | Paver et al. ...................... 712/34 |
| 2005/0114629 A1 | * | 5/2005 | Altman et al. ................. 712/209 |
| 2005/0160097 A1 | | 7/2005 | Gschwind et al. |
| 2006/0174089 A1 | * | 8/2006 | Altman et al. ................... 712/24 |
| 2008/0215856 A1 | * | 9/2008 | Gschwind et al. ............. 712/220 |

OTHER PUBLICATIONS

David Bernstein et al., "Spill code Minimization Techniques for Optimizing Compilers", ACM; pp. 258-263; 1989.

Chaitin, in "Register Allocation and Spilling via Graph Coloring", ACM SIGPLAN Conference on Compiler Construction; pp. 98105; Jun. 1982.

Briggs et al., in "Coloring Heuristics for Register Allocation", ACM SIGPLAN Conference on Programming Language Design and Implementation; pp. 275-284; Jul. 1989.

Briggs et al., in "Coloring Register Pairs", ACM Letters on Programming Languages and Systems, vol. 1, No. 1; pp. 3-13; Mar. 1992.

Briggs et al., in "Rematerialization", ACM SIGPLAN '92 Conference on Programming Language Design and Implementation; pp. 311-321; Jun. 1992.

Briggs et al., in "Improvements to Graph Coloring Register Allocation", ACM Transactions on Programming Languages and Systems, vol. 16, No. 3; pp. 1-26; May 1994.

Chow et al., in "Register Allocation by Priority-Based Coloring", ACM SIGPLAN Conference on Compiler Construction; pp. 222-232; Jun. 1984.

Chow et al., "The Priority-Based Coloring Approach to Register Allocation", ACM Transactions on Programming Languages and Systems, vol. 12, No. 4; pp. 501-536; Oct. 1990.

Vegdahl, in "Using Node Merging to Enhance Graph Coloring", ACM SIGPLAN Conference on Programming Language Design and Implementation; pp. 150-154; May 1999.

Park et al., in "Optimistic Register Coalescing", ACM Transactions on Programming Languages and Systems, vol. 26, No. 4; pp. 7350765; Jul. 2004.

Chaitin et al., in "Register Allocation Via Coloring", IBM Research Report 8395; 12 pages; 1980.

Chaitin, in "Register Allocation and Spilling via Graph Coloring", ACM; pp. 98-105; 1982.

Runeson et al., in "Generalizing Chaitin's Algorithm: Graph Coloring Register Allocation for Irregular Architectures", Uppsala University Technical report 2002-021, Uppsala, Sweden; pp. 1-13; 2002.

Smith et al., in "A Generalized Algorithm for Graph Coloring Register Allocation", ACM SIGPLAN Conference on Programming Language Design and Implementation; pp. 277-288; Jun. 2004.

Kong et al., in "Precise Register Allocation for Irregular Register Architectures", 31st annual ACM/IEEE International Symposium on Microarchitecture;pp. 297-307; Nov. 1998.

Larsen et al., "Exploiting Superword Level Parallelism with Multimedia Instruction Sets", MIT Laboratory for Computer Science; 12 pages; 2002.

Eichenberger et al., "Vectorization for SIMD Architectures with Alignment Constraints" PLDI '04, Washington, DC; 12 pages; 2004.

Moreno et al., in "An innovative low-power high-performance programmable signal processor for digital communications", IBM Journal of Research and Development, vol. 47, No. 2/3; pp. 299-326; 2003.

Brian Nickerson, "Graph Coloring Register Allocation for Processors with Multi-Register Operands", Jun. 1990, ACM Publishing, pp. 40-52.

Rajiv Gupta et al, "Efficient Register Allocation Via Coloring Using Clique Separators", May 1994, ACM Publishing pp. 370-386.

* cited by examiner

500

| OPCD | VT | RA | RB | XO | / |
| OPCD | VS | RA | RB | XO | / |
| 0 | 6 | 11 | 16 | 21 | 31 |

| OPCD | VT | VA | VB | VC | | XO |
| OPCD | VT | VA | VB | / | SHB | XO |
| 0 | 6 | 11 | 16 | 21 | 22 | 26 | 31 |

| OPCD | VT | VA | VB | XO |
| OPCD | VT | / / / / / | VB | XO |
| OPCD | VT | UIM | VB | XO |
| OPCD | VT | / | UIM | VB | XO |
| OPCD | VT | / / | UIM | VB | XO |
| OPCD | VT | / / / | UIM | VB | XO |
| OPCD | VT | SIM | / / / / / | XO |
| OPCD | VT | / / / / / | VB | XO |
| 0 | 6 | 11 | 16 | 21 | 31 |

| 1502 → | OPCD | VS | RA | RB | XO | VSX | XO |
|---|---|---|---|---|---|---|---|
| 1504 → | OPCD | VT | RA | RB | XO | VTX | XO |
| | 0 | 6 | 11 | 16 | 21 | 28 | 30  31 |

| 1522 → | OPCD | VT | VA | VB | AX | XO | VC | AX | XO | VTX | VBX |
|---|---|---|---|---|---|---|---|---|---|---|---|
| 1524 → | OPCD | VT | VA | VB | AX | SHB | | AX | XO | VTX | VBX |
| | 0 | 6 | 11 | 16 | 21 | 22  23 | | 26 | 27 | 28 | 30  31 |

| | OPCD | VT | VA | VB | AX | XO | AX | XO | VTX | VBX |
|---|---|---|---|---|---|---|---|---|---|---|
| 1541 → | OPCD | VT | VA | VB | AX | XO | AX | XO | VTX | VBX |
| 1542 → | OPCD | VT | VA | VC | AX | XO | AX | XO | VTX | VCX |
| 1543 → | OPCD | VT | / / / / / | VB | XO | | | | VTX | VBX |
| 1544 → | OPCD | VT | / / / / / / / / / / | | XO | | | | VTX | XO |
| 1545 → | OPCD | VT | SIM | / / / / / | XO | | | | VTX | / / |
| 1546 → | OPCD | VT | UIM | VB | XO | | | | VTX | VBX |
| 1547 → | OPCD | VT | / / UIM | VB | XO | | | | VTX | VBX |
| 1548 → | OPCD | VT | / / / UIM | VB | XO | | | | VTX | VBX |
| 1549 → | OPCD | VT | / WMASK | VB | XO | SHW | | XO | VTX | VBX |
| 1550 → | OPCD | VT | DT | MS | VB | XO | SHW | XO | VTX | VBX |
| 1551 → | OPCD | VT | DT | / / | VB | XO | | | | VTX | VBX |
| 1552 → | OPCD | VT | UIM | VB | XO | UIX | | XO | VTX | VBX |
| | 0 | 6 | 11 12 13 14 | 16 | 21 22 23 24 | 26 27 | | 28 29 | 30 31 |

| OPCD | VS | RA | RB | XO | / / | S | XO |
|---|---|---|---|---|---|---|---|
| OPCD | VT | RA | RB | XO | / / | T | XO |

| OPCD | VT | VA | VB | VC | XO | A | B | T | C |
|---|---|---|---|---|---|---|---|---|---|
| OPCD | VT | VA | VB | XO | SHB | XO | A | B | T | XO |

| OPCD | VT | VA | VB | XO | A | B | T | XO |
|---|---|---|---|---|---|---|---|---|
| OPCD | VT | / / / / / | VB | XO | / | B | T | XO |
| OPCD | VT | UIM | VB | XO | / | B | T | XO |
| OPCD | VT | / UIM | VB | XO | / | B | T | XO |
| OPCD | VT | / / UIM | VB | XO | / | B | T | XO |
| OPCD | VT | / / / UIM | VB | XO | / | B | T | XO |
| OPCD | VT | SIM | | XO | / / | T | XO |
| OPCD | VT | / / / / / | VB | XO | / | B | T | XO |

| OPCD | VT | VA | VB | Rc | XO | A | B | T | XO |
|---|---|---|---|---|---|---|---|---|---|

METHODS FOR GENERATING CODE FOR AN ARCHITECTURE ENCODING AN EXTENDED REGISTER SPECIFICATION

CROSS-REFERENCE TO RELATED APPLICATIONS

This is a Continuation application of U.S. application Ser. No. 12/062,057, filed Apr. 3, 2008, incorporated herein by reference in its entirety, which is itself a Continuation application of abandoned U.S. application Ser. No. 11/446,031, filed Jun. 2, 2006, incorporated herein by reference in its entirety. This is a non-provisional application claiming the benefit of U.S. provisional application Ser. No. 60/707,572, entitled "Methods for Generating Code for an Architecture Encoding an Extended Register Specification", filed on Aug. 12, 2005, which is incorporated by reference herein. Moreover, this application is related to issued U.S. Pat. No. 7,421,566, filed Jun. 2, 2006, incorporated by reference herein.

BACKGROUND

1. Technical Field

The present invention relates generally to computers and, more particularly, to methods for generating code for an architecture encoding an extended register specification.

2. Description of the Related Art

In modern microprocessors, increases in latencies have been an increasingly severe problem. These increases are occurring both for operations performed on the chip, and for memory access latencies. There are a number of reasons for this phenomenon.

One reason is that the trend to achieve ever higher performance results in increased use of high clock frequencies. This leads to deeper pipelining (i.e., the division of a basic operation into multiple stages) and, hence, a larger number of total stages as an operation is divided into ever-smaller units of work to achieve these high frequencies.

Another reason relates to the differences in chip and memory speeds. That is, while both chip and memory speeds have been increasing, memory speed has been increasing at a much smaller rate. Thus, in terms of processor cycles to access a location in memory, latency has increased significantly. The relatively faster increase in chip speed is due to both the above-mentioned deep pipelining, and to CMOS scaling used as a technique to increase chip speeds, as disclosed by R. H. Dennard et al., in "Design of Ion-Implanted MOSFETs with Very Small Physical Dimensions," IEEE Journal of Solid-State Circuits, SC-9, pp. 256-68, 1974, which is incorporated by reference herein.

Moreover, another reason for the increasing latencies relates to differences in wire and logic speeds. That is, as CMOS scaling is applied ever more aggressively, wire speeds do not scale at the same rate as logic speeds, leading to a variety of latency increases, e.g., increasing the time required to complete operations by requiring longer time to write back their results.

In addition to aggressive technology scaling and deep pipelining, computer architects have also turned to the use of more aggressive parallel execution by means of superscalar instruction issue, whereby multiple operations can be initiated in a single cycle. Recent microprocessors such as the state-of-the art Power5 or PowerPC 970 processor can dispatch 5 operations per cycle and initiate operations at the rate of 7 and 9 operations per cycle, respectively.

To continue improving the performance of microprocessors, there are two challenges of significance: achieving high levels of parallelism; and tolerating increasing latency (in terms of processor cycles) of memory. Both achieving higher parallelism and tolerating longer latency requires programs to be compiled to use more independent strands of computation simultaneously. This, in turn, requires a large number of registers to be available to support the multiple independent strands of computation by storing all of their intermediate results.

A result of the ability to execute more instructions in pipelines with increasing latency, and to initiate execution in multiple pipelines, requires ever-larger amounts of data to be maintained by a processor in order to serve as inputs or to be received as results of operations. To accomplish this, architects and programmers have two options, namely retrieve and store data in a memory hierarchy, or in on-chip register file storage.

Of these choices, register file storage offers multiple advantages, including higher bandwidth and shorter latency, as well as lower energy dissipation per access. However, the number of registers specified in architectures has not increased since the introduction of RISC computing (when the size of register files was increased from the then customary 8 or 16 registers to 32 registers) until recently. Thus, as the demands for faster register storage grow, to buffer input operands and operation results from an increasing number of instructions simultaneously being executed, the number of architected registers has stayed constant while the performance of memory hierarchies has de facto decreased (in terms of processor cycles required to provide data to the processor core).

To show how the effectiveness of register files has diminished in light of changes to processor architecture that have occurred in response to technology shifts, consider the following simple ratios. Approximately 15 years ago, circa 1990, a high-end processor would typically have one floating point pipeline, with about 3 computational pipeline stages, plus an additional cycle for register file access. When processing FMA operations, i.e., merged floating-point multiply-add high performance computation primitives, a pipeline would have 4 FMA operations in flight (one per pipeline stage), each requiring 3 input registers and one output register, for a total of 16 registers to support all computations in flight. Given the typical complement of 32 floating-point registers, this would leave an additional 16 registers to hold other data and/or constants. Considering the parallelism provided by state-of-the-art microprocessors, coupled with the latencies incurred by deep pipelining, the number of registers required to supply and store sufficient operands to exploit the peak execution rate provided by a modern microprocessor is well in excess of the 32 floating-point registers typically provided in the instruction set architecture.

Similarly, in past machines, a second level cache could be accessed with a 3 cycle hit latency, which gives a ratio of about 10 registers available per cycle of latency to L2 cache (i.e., 32 registers divided across the 3 access cycles). This is a conservative measure; the actual number of registers required to completely cover an L2 cache access (and therefore to decouple memory access from computational use) in a more realistic scenario would depend on the actual number of operands consumed during such time, which scales up with issue width. Today, with a 10-12 cycle latency to L2 cache, to preserve a similar 10 registers per cycle ratio would require between 100 and 120 registers.

Large numbers of registers are in fact built, e.g., both the Power4 and Power5 microprocessors implement many more than the 32 architected registers. Several recent microprocessors implement a technique called register renaming, whereby the limited number of architected registers is translated to use a larger pool of (physical) registers internally. However, to exploit these larger register files, complex (and area intensive) renaming logic and out-of-order issue capabilities are required. Even then, the inability to express the best schedule for the program using a compiler or a skillfully tuned Basic Linear Algebra Subprogram (BLAS) or other such library limits the overall performance potential.

While register renaming does allow an increase in the number of registers, register renaming is a complex task that requires additional steps in the instruction processing of microprocessors. Thus, what is required to address the challenges in modern microprocessor design is an increased number of registers that are easy to access using an extended name space in the architecture, as opposed to techniques such as register renaming used in high-end microprocessors such as the IBM PowerPC 970 and Power5.

Recently, the IA-64 architecture and the CELL SPU architecture have offered implementations with 128 architected registers. In reference to these implementations, the IA-64 offers an implementation using instruction bundles, a technique to build instruction words wider than a machine word. While this resolves the issue of instruction encoding space, it leads to inefficient encoding due to a reduction of code density because an instruction word disadvantageously occupies more than a single machine word, thereby reducing the number of instructions which can be stored in a given memory unit.

Recent advances in the encoding of instruction sets, disclosed in the U.S. patent application to Altman et al., entitled "Method and Apparatus to Extend the Number of Instruction Bits in Processors with Fixed Length Instructions in a Manner Compatible with Existing Code", U.S. patent application Ser. No. 10/720,585, filed on Nov. 24, 2003, which is commonly assigned and incorporated by reference herein, advantageously allows wide instruction words to be used in conjunction with fixed size word instruction set architectures having an instruction format requiring only a single machine word for most instructions. While this offers a significant advantage over prior wide-word bundle-oriented instruction sets in terms of code density, decoding complexity is increased.

In an advantageous implementation of fixed width 32 bit instruction words, the CELL SPU instruction set architecture supports the specification of 128 registers in a 32 bit instruction word, implementing a SIMD-ISA in accordance with the U.S. patent application to Gschwind et al., entitled "SIMD-RISC Microprocessor Architecture", U.S. patent application Ser. No. 11/065,707, filed on Feb. 24, 2005, and the U.S. Pat. No. 6,839,828 to Gschwind et al., entitled "SIMD Datapath Coupled to Scalar/Vector/Address/Conditional Data Register File With Selective Subpath Scalar Processing Mode", which are commonly assigned and incorporated by reference herein.

While the SPU advantageously offers the use of 128 registers in a fixed instruction word using a new encoding that, in turn, uses fields of 7 adjacent bits in a newly specified instruction set, this is accomplished in an entirely new instruction set architecture without regard to existing (legacy) instructions or programs. Legacy architectures, on the other hand, are not without deficiency. For example, since many bit combinations have been assigned a meaning in legacy architectures, and certain bit fields have been set aside to signify specific architectural information (such as extended opcodes, register fields, and so forth) legacy architectures offer significant obstacles to encoding new information. Specifically, when allocating new instructions, the specification for these new instructions cannot arbitrarily allocate new fields without complicating the decoding of both the pre-existing and these new instructions.

Additionally, the number of bits in instruction sets with fixed instruction word width limits the number of different instructions that can be encoded. For example, most RISC architectures use fixed length instruction sets with 32 bit instruction words. This encoding limitation is causing increasing problems as instruction sets are extended. For example, there is a need to add new instructions to efficiently execute modern applications. Primary examples are multimedia extensions such as INTEL's MMX, SSE and SSE2 and the PowerPC VMX/Altivec extensions. Moreover, the number of cycles required to access caches and memory is growing as the processor frequencies increase. One way to alleviate this problem is to add more registers to the processor to reduce the number of loads and stores (typically required to spill and restore register values when insufficient register resources or names are available). However, it is difficult or impossible to specify additional registers in the standard 32-bit RISC instruction encoding.

The most common solution to this problem is an approach typically associated with CISC architectures, which allows multiple instruction lengths, rather than maintaining a single, fixed instruction size such as 32 bits. This variable length CISC approach has several drawbacks, and was one of the reasons RISC was developed in the 1980's. Among the problems associated with variable length CISC encoding is the additional complexity it requires in the instruction decode, resulting in additional decode pipeline stages in the machine or a reduced frequency. Moreover, another problem with variable length CISC encoding is that it allows instructions to span natural memory boundaries (e.g., cache line and page boundaries), complicating instruction fetch and virtual address translation. Another problem with variable length CISC encoding is that such a CISC approach cannot be compatibly retrofitted to a RISC architecture. For example, architectures having fixed length instructions today assume pervasively that all instructions are aligned on the boundary, that branch addresses are specified at a multiple of a fixed length instruction, and so forth. Further, no mechanisms are defined to address the issue of page-spanning instructions, and so forth.

A second solution to the problem would be to widen all instructions to a wider format, preferably a multiple of the original instruction set. For typical 32 bit RISC instruction sets, the next multiple is 64-bit instructions. However, if all instructions are 64-bits, approximately twice as much memory space as is currently used would be required to hold instructions (which would disadvantageously affect elements like an instruction cache). In addition, this is incompatible with existing RISC code with 32-bit instructions. If 32-bit and 64-bit instructions are intermixed, then the instruction set becomes CISC-like with variable width instructions, and with the associated problems described above.

Another solution to the encoding problem is employed by the IA-64 architecture from INTEL and HEWLETT PACKARD. The IA-64 packs three instructions in 16 bytes, for an average of 42.67 bits per instruction. All instruction bundles in this IA-64 encoding are located at multiples of the bundle size. This provides a simplification of some aspects, e.g., an implementation can avoid the issues associated with bundles crossing natural memory boundaries, but does not address the other significant drawbacks.

This style of instruction bundles encoding avoids problems with page and cache line crossings. However, it "wastes" bits specifying the interaction between instructions. For example, "stop bits" are used to indicate if all three instructions can be executed in parallel or whether they have to be executed sequentially or some combination of the two. The three instruction packing also forces additional complexity in the implementation to deal with three instructions at once. Finally, this three instruction packing format has no requirement to be compatible with existing 32-bit instruction sets, and there is no obvious mechanism to achieve compatibility with (legacy) 32-bit RISC encodings.

A number of approaches have been disclosed to address this increasingly severe problem of insufficient space to encode extended register names within an existing instruction set while maintaining compatibility with legacy programs, tools, and so forth.

U.S. Pat. No. 6,157,996 to Christie et al., entitled "Processor Programably Configurable to Execute Enhanced Variable Byte Length Instructions Including Predicated Execution, Three operand Addressing, and Increased Register Space", which is incorporated by reference herein, teaches the use of a prefix byte to extend instruction semantics to include at least one of predicate information, extended register specification, and a third register operand. This embodiment is undesirable for fixed instruction width RISC processors, as extension bytes are generally incapable of being accommodated in the instruction stream of a fixed width instruction set architecture.

U.S. Pat. No. 6,014,739 to Christie, entitled "Increasing General Registers in X86 Processors", which is incorporated by reference herein, discloses that an extra byte is extended in a variable instruction set to provide additional encoding bits. This embodiment is undesirable for fixed instruction width RISC processors, as extension bytes cannot readily be accommodated in the instruction stream of a fixed width instruction set architecture.

U.S. Pat. No. 5,822,778 to Dutton et al., entitled "Microprocessor and Method of Using a Segment Override Prefix Instruction Field to Expand the Register File", which is incorporated by reference herein, discloses a microprocessor with expanded functionality within an existing variable length instruction set architecture. A control unit detects the presence of segment override prefixes in instruction code sequences executed in flat memory mode and uses prefix values to select a bank of registers. Those skilled in the art will understand that the cost of decoding a prefix, determining the mode and the bank field, accompanied by fetching the instruction being modified by the prefix, incurs a significant complexity, delay and hardware inefficiency. In particular, the decoding of the prefix and bank selector has to be performed early, leading to additional complexity. In addition, prefixes are generally not readily employed in an architecture supporting only a fixed instruction word width.

Another non-transparent use of segment register override prefix bytes may be embodied within an instruction decode/execution unit. A decode/execution unit reads instructions, and operates on operands in a register (or registers) specified in the instruction. In this embodiment, segment register override prefix bytes are used by a control unit to select one of multiple register banks which store the operands to be operated on by the decode/execution unit. Each register bank includes the full complement of x86 registers. In this manner, the register set of the architecture may be expanded without changing the instruction encodings. As will be appreciated by those skilled in the art, a larger register set allows more operand values to be held in registers (which may be accessed quickly) and, thus, accesses to memory (which typically require a longer period of time) are lessened. In one embodiment, no segment register override prefix byte specifies the first bank of registers, a segment register override prefix byte indicating the FS segment register specifies a second bank of registers, a segment register override prefix byte indicating the GS segment register specifies a third bank of registers, and a segment register override prefix byte indicating the ES segment register specifies a fourth bank of registers. In another embodiment, the value stored within the selected segment register is used to select the appropriate register bank from numerous register banks.

In accordance with the preceding description relating to the other non-transparent use of segment register override prefix bytes embodied within an instruction decode/execution unit, all operands for a given instruction have to be retrieved from a common bank selected by the prefix selector, specified within the prefix selector in an alternate embodiment. Using the segment selector as a bank selector for all operands of a given instruction is undesirable because it requires access to a control register to identify a bank, and restricts all instructions to have operands coming from just a single bank, leading to inefficient register allocation. Thus, if a common value has to be combined with other operands residing in multiple banks, copies of the common value have to be maintained, computed and updated in all banks, such that they can be combined with the other operands residing in the other banks, leading to inefficient register usage due to data duplication, and inefficient performance profile due to the duplication of work to compute the common value in all banks. It is to be appreciated that the preceding implementation has to be programmed similar to a clustered machine, with distinct register files represented by the different banks.

U.S. Pat. No. 5,822,778 to Dutton et al., entitled "Microprocessor and Method of Using a Segment Override Prefix Instruction Field to Expand the Register File", which is incorporated by reference herein, discloses that the prefix and the bank select are decoded first, before the instruction is actually retrieved. Then the instruction word is combined, and an access performed. In comparison, the wide select can start the access early, and decode additional information in parallel with the access cycle.

U.S. Pat. No. 5,768,574 to Christie et al., entitled "Microprocessor Using an Instruction Field to Expand the Condition Flags and a Computer System Employing the Microprocessor", which is incorporated by reference herein, discloses a microprocessor that is configured to detect the presence of segment override prefixes in instruction code sequences being executed in flat memory mode, and to use the prefix value or the value stored in the associated segment register to selectively enable condition flag modification for instructions. An instruction which modifies the condition flags and a branch instruction intended to branch based on the condition flags set by the instruction may be separated by numerous instructions which do not modify the condition flags. When the branch instruction is decoded, the condition flags it depends on may already be available. In another embodiment, the segment register override bytes are used to select between multiple sets of condition flags. Multiple conditions may be retained by the microprocessor for later examination. The conditions that a program utilizes multiple times may be maintained while other conditions may be generated and utilized.

U.S. Pat. No. 5,838,984 to Nguyen et al., entitled "Single-Instruction-Multiple-Data Processing Using Multiple Banks of Vector Registers", which is incorporated by reference herein, discloses a digital signal parallel vector processor for multimedia applications. As disclosed therein, a single instruction multiple data processor uses several banks of vector registers. This processor uses a bank bit included in a control register to identify a primary bank, and a secondary alternate bank to be identified by a select set of instructions. This is undesirable because it requires the access to a control register to identify a bank, and restricts all operations to have operands coming from just a single bank, leading to inefficient register allocation. Thus, if a common value has to be combined with other operands residing in multiple banks, copies of the common value have to be maintained, computed and updated in all banks, such that they can be combined with the other operands residing in the other banks, leading to inefficient register usage due to data duplication, and inefficient performance profile due to the duplication of work to compute the common value in all banks. It is to be appreciated that the preceding implementation has to be programmed similar to a clustered machine, with distinct register files represented by the different banks.

U.S. Pat. No. 5,926,646 (hereinafter the "'646 patent") to Pickett et al., entitled "Context-Dependent Memory-Mapped Registers for Transparent Expansion of a Register File", which is incorporated by reference herein, discloses a context dependent memory mapped register accessing device for transparent expansion of a register file in a microprocessor of a computer system. Therein, in-core registers are made available as a memory-mapped address space. While the adding of additional registers in the core to be referenced by the processor is allowed, the use of memory mapping has several disadvantages. Specifically, the disadvantages relate to the fact that register names can only be properly resolved after the address generation phase, as a multitude of memory address forms can refer to a memory mapped register. This will increase the latency of access to these registers to almost the latency for first level cache access. In addition, a memory-mapped register can only be referenced for those instructions that have operand forms allowing memory accesses. This typically represents only a subset of operations, and often only a subset of operands therein. This limitation is particularly severe for RISC processors, which can only reference memory operands in load and store operations, imposing the additional cost of performing copies from the memory-mapped in-core registers to computationally useable operand registers.

In another disadvantageous aspect of the '646 patent, when addresses are generated before address generation from a subset of "preferred forms", address aliasing can occur and lead to incorrect program execution. In yet another disadvantageous aspect of the '646 patent, when an address to such in-core register is added to a linked list, and accessed by a remote processor, this will lead to data coherence inconsistencies. Alternatively, costly methods for accessing such registers from SMP remote nodes have to be implemented and provided.

U.S. Pat. No. 6,154,832 to Maupin, entitled "Processor Employing Multiple Register Sets to Eliminate Interrupts", which is incorporated by reference herein, discloses a processor which assigns a specified register set for a default task and other sets for different interrupt sources. While this extends the number of registers implemented in the processor, such an approach is not suitable for the extension of the register set useable by a single process or program.

U.S. Pat. No. 5,737,625 (hereinafter referred to as the "'625 patent") to Jaggar, entitled "Selectable Processing Registers and Method", which is incorporated by reference herein, discloses a high performance memory register selection apparatus which has a controller responding to a selection-word to control a circuit to select registers depending on the control field of a word and the prior register selection. This is limited in that only the architected set of prior art registers can be accessed at any one time, thus not making more than the number of prior art registers available at any one time.

In another disadvantageous aspect of the '625 patent, additional instructions are required in the instruction stream to update the control word. In typical implementations, these updates will have to be made context synchronizing, i.e., no operations before the update may have outstanding references, nor can any instruction occurring in the instruction stream be dispatched until the control register update has completed. In one non-synchronizing aspect of an implementation, multiple rename versions of the control register have to be maintained, disadvantageously leading to design complexity, and high area and power usage.

U.S. Pat. No. 5,386,563 to Thomas, entitled "Register Substitution During Exception Processing", which is incorporated by reference herein, discloses a data processing system operable in either main or exception processing mode. In accordance with the invention, the CPU restores data stored in a saved processing status register, to another register upon leaving exception-processing mode. While this extends the number of registers implemented in the processor, this is not suitable for the extension of the register set useable by a single process or program.

Microcode used for implementing microprocessor ISAs using internal layering has used a variety of formats, using contiguous or non-contiguous fields. None of these were concerned with the maintenance of cross-generational compatibility or programming orthogonality. In general, microcode has different requirements, and methods from microcode are recognized to not be applicable to architected instruction sets by those skilled in the art due to issues related to the internal representation, requirements for compatibility, decoding of instructions and detection of data and structural hazards (which are not supported in the restricted microcode programming model), as well as the need of maintaining compatible across generations of a design.

Prior art instruction sets have offered the use of non-contiguous immediate constants, e.g., as disclosed by Moreno et al., in "An innovative low-power high-performance programmable signal processor for digital communications", IBM Journal of Research and Development, Vol. 47, No. 2/3, 2003, which is incorporated by reference herein, to allow extended immediate specifications in bundle encodings, but do not address the encoding of non-contiguous fields in a fixed width instruction. The issues for immediate operand and similar fields are different because they do not require any early steering and access to determine dependences, access of register files, and so forth. In particular, this has also not required advanced decoding and register file access implementations. Thus, while constants have been encoded in non-contiguous ways in bundle instruction sets, the encoding of non-contiguous register file specifiers in fixed width instruction sets have not been address in this and other instruction sets.

In accordance with modern compilation techniques, register allocation is usually performed using graph coloring techniques, as first described by Chaitin, in "Register Allocation and Spilling via Graph Coloring", ACM SIGPLAN Conference on Compiler Construction, June 1982, which is incorporated by reference herein. Briggs et al., in "Coloring Heuristics for Register Allocation", ACM SIGPLAN Conference on Programming Language Design and Implementation, July 1989, which is incorporated by reference herein, disclose an improved framework for spill code handling. Briggs et al., in "Coloring Register Pairs", ACM Letters on Programming Languages and Systems, Vol. 1, No. 1, March 1992, which is incorporated by reference herein, disclose a method for improved handling of register pairs in conjunction with Chaitin's method. Briggs et al., in "Rematerialization", ACM SIGPLAN '92 Conference on Programming Language Design and Implementation, June 1992, which is incorporated by reference herein, disclose a method for reducing the cost of spill code. Briggs et al., in "Improvements to Graph Coloring Register Allocation", ACM Transactions on Programming Languages and Systems, Vol. 16, No. 3, May 1994, which is incorporated by reference herein, describe a framework for generalized register allocation with reduced spill code, register pairing, and coalescing methods.

Chow et al., in "Register Allocation by Priority-Based Coloring", ACM SIGPLAN Conference on Compiler Construction, June 1984, which is incorporated by reference herein, disclose an alternate method of applying register allocation using graph coloring based on live range splitting. Vegdahl, in "Using Node Merging to Enhance Graph Coloring", ACM SIGPLAN Conference on Programming Language Design and Implementation, May 1999, which is incorporated by reference herein, describes the use of node merging to enhance graph coloring for nodes which may be allocated to a same register. Park et al., in "Optimistic Register Coalescing", ACM Transactions on Programming Languages and Systems, Vol. 26, No. 4, July 2004, which is incorporated by reference herein, disclose improved methods for optimistic register coalescing.

While the referenced work describes a general framework for performing register allocation using graph coloring, coalescing, spill code optimization, and paired register allocation, and so forth, none of the described prior works deals with code generation for an architecture with an extended register specification as outlined herein.

Chaitin et al., in "Register Allocation by Coloring", IBM Research Report 8395, 1980, which is incorporated by reference herein, propose the introduction of additional graph nodes and edges to the interference graph in order to represent constraints. While this allows representing the constraints of the specification, the approach was proposed to incorporate constraints covering a small set of nodes. Adding a significant number of edges and nodes to represent architecture constraints represents a significant cost, as indicated by Chaitin et al., in "Register Allocation and Spilling via Graph Coloring", which is incorporated by reference herein. The register interference graph is a large and massive data structure, and it is important to represent it in a manner that uses as little storage as possible consistent with the ability to process it at high speed."

Runeson et al., in "Generalizing Chaitin's Algorithm: Graph Coloring Register Allocation for Irregular Architectures", Uppsala University Technical report 2002-021, Uppsala, Sweden, which is incorporated by reference herein, describe an extension to Chaitin's algorithm for irregular architectures. In accordance with Runeson et al., a colorability test called "<p,q> test" is implemented. However, while this test allows the representation of constraints in an irregular architecture, it is only an approximation of colorability. In addition, while this test allows for the representation of colorability for a wide range or architectures, the test is expensive to implement, resulting in slow compilation times.

Smith et al., in "A Generalized Algorithm for Graph Coloring Register Allocation", ACM SIGPLAN Conference on Programming Language Design and Implementation, June 2004, which is incorporated by reference herein, describe a similar test, with similar deficiencies.

Kong et al., in "Precise Register Allocation for Irregular Register Architectures", 31st annual ACM/IEEE International Symposium on Microarchitecture, November 1998, which is incorporated by reference herein, describe an integer programming approach to register allocation. Using integer programming for register allocation gives good allocation results, but at the expense of runtime (i.e., long compilation times).

Turning to FIG. 1A, a register allocation method 100 is indicated generally by the reference numeral 100. The method 100 of FIG. 1A is described in the above-referenced article by Chaitin entitled "Register allocation and spilling via graph coloring".

In step 110, an interference graph is built. In step 120, the interference graph is simplified by applying a colorability test to each node and, if the node is determined to be colorable, pushing that colorable node onto the stack. The node is then removed from the graph. This step is repeated until no colorable nodes can be found. When no colorable nodes can be found, control transfers to step 130 ("spill"). A node is selected and removed from the graph for use as memory operand. Spill code is inserted to ensure references to the spilled node can be properly executed. The method then transfers to step 110. In step 140, the graph is colored by removing nodes from the stack in last-in, first-out order and allocating colors to nodes.

Turning to FIG. 1B, an improved register allocation method is indicated generally by the reference numeral 140. The method 140 of FIG. 1B is described in the above-referenced article by Briggs entitled "Coloring Heuristics for Register Allocation".

In step 150, an interference graph is built. In step 160, the interference graph is simplified by applying a colorability test to each node, and pushing a colorable node on the stack. The node is then removed from the graph. This step is repeated until no colorable nodes can be found. When no colorable node is found, a spill candidate is identified, and pushed on the stack. The node is then removed from the graph. Coloring then resumes. In step 170, the graph is colored by removing nodes from the stack in last-in, first-out order and allocating colors to nodes, by selecting a color that is not in interference with the node. When a node is found which cannot be colored, because it has k or more neighbors, it is left uncolored. After the coloring has been completed, if any nodes are uncolored, control transfers to step 180 ("spill"). Otherwise, the method terminates after step 170. In step 180, spill code is generated, and control transfers to step 150.

The method described by Chow et al. in the above-referenced article entitled "Register Allocation by Priority-Based Coloring" follows the basic algorithm described above, but uses live range splitting in lieu of spilling.

Referring now to step 120 of FIG. 1A, and step 160 of FIG. 1B, the central operation during the simplify step is the performance of the colorability test.

Turning to FIG. 2, a method illustrating the simplify steps 120 and 160 of FIGS. 1A and 1B, respectively, is indicated generally by the reference numeral 200.

In step 210 a node is selected. In step 220, the colorability test is performed. In accordance with Chaitin as described in "Register Allocation and Spilling via Graph Coloring" (and also used by Briggs et al., as described in the above-referenced article entitled "Coloring Heuristics for Register Allocation", and Chow et al., in the above-referenced article entitled "Register Allocation by Priority-Based Coloring"), this test is of the form degree (node)<k. Disadvantageously, this test cannot determine colorability in an extended register specification as set forth herein.

As described by Runeson et al. in the above-referenced article "Generalizing Chaitin's Algorithm: Graph Coloring Register Allocation for Irregular Architectures", a <p,q> test is performed. As described by Smith et al. in the above-referenced article "A Generalized Algorithm for Graph Coloring Register Allocation", a similar test is performed. Disadvantageously, these tests are only an approximation and are excessively general, and hence expensive to implement.

In step 230, if the outcome of the test is positive (i.e., indicating that the node is colorable), control transfers to step 240. Otherwise, if the test is not successful, control transfers to step 250.

In step 240, a colorable node has been identified. The node is pushed on the stack, removed from the interference graph, the node counts are updated, and control passes to step 210 to select the next node.

In step 250, the node has been determined to not be colorable. If any potentially colorable nodes are left, control transfers to step 210 to select the next node. If no colorable nodes are left, control transfers to step 260.

In step 260, no colorable nodes are found, and a spill candidate is selected. If a spill candidate is identified, control passes to step 270. Otherwise, if no spill candidate can be found, and no node is colorable, the graph is empty, and the "simplify" phase has completed and the simplify method terminates.

In step 270, a spill candidate has been found. It is handled in accordance with one or more specific methods for handling a spill candidate: (1) in accordance with the above-referenced article by Chaitin, entitled "Register allocation and spilling via graph coloring", the spill candidate is spilled immediately, and spill code is inserted; (2) in accordance with the above-referenced article by Briggs, entitled "Coloring Heuristics for Register Allocation", the spill candidate is pushed on the stack, and spill code will be generated later; and (3) in accordance with the above-referenced article by Chow et al., entitled "Register Allocation by Priority-Based Coloring", the live range will be split.

In step 280, the original node is removed from the interference graph, the node counts are updated, and control passes to step 210 to select the next node.

Thus, what is needed is an improved register allocation approach with an improved register colorability test.

In another aspect of allocating registers for the described registers, spill code should be optimized.

In traditional register allocation, when a register requirement cannot be allocated to a register satisfying its constraints (i.e., it is not colorable), then some register is spilled to memory. In accordance with an implementation of an extended register specification, it can be preferable to spill a register into an alternate register class of the specification.

A brief description of the handling of intrinsics in accordance with the prior art will now be given.

Referring now to the use of intrinsic as a specification of operations to be executed by a program, the current state of the art is shown in FIG. 3. Turning to FIG. 3, a method for handling intrinsics is indicated generally by the reference numeral 300.

In step 310 a specific intrinsic is identified. In step 320 an intermediate language IL representation is generated from the program-specified intrinsic. In step 330 register allocation is performed in accordance with a known register allocation method. In step 340, an ISA specific encoding is performed, but excluding the used of a fixed-width instruction word extended register specification. The method terminates after step 340.

Turning to FIG. 4, another method for processing intrinsics is indicated generally by the reference numeral 400. The method 400 is based on an advanced use of polymorphic intrinsics (i.e., intrinsics which specify an operation where the specific instruction is one from a set of instructions, dependent on the operand data type) such as specified in the VMX application programming interface.

In step 410, an intrinsic is identified. In step 420, a test is performed identifying the intrinsic specification in the program representation to refer to one of a polymorphic and a non-polymorphic intrinsic. If the intrinsic is not polymorphic, control transfers to step 430. If the intrinsic is polymorphic, control transfers to step 440.

In step 430, the intrinsic is known to be not polymorphic. The intrinsic is directly mapped to its internal language (IL) representation, and processing continues with step 450.

In step 440, a polymorphic intrinsic has been encountered. In accordance with the polymorphic intrinsic specification, the intrinsic type is derived from the input data types at the high level language level (i.e., specified by the programmer using the high level language's data type system). A simple table lookup is made, and the IL representation of a specific intrinsic is generated based on the specification provided by the data type. Processing continues with step 450.

In step 450 register allocation is performed in accordance with a known register allocation method.

In step 460, an ISA specific encoding is performed, but excluding the used of a fixed-width instruction word extended register specification. The method terminates after step 460.

Referring now to FIGS. 5A-5C, there are shown instruction formats 500, 530, and 560, respectively, for the VMX instruction set extension to the PowerPC architecture. In accordance with the VMX instruction set specification, a VMX instruction includes a 6 bit primary opcode field in bit positions 0 to 5 (labeled as opcode OPCD field).

VMX instructions are encoded using one of 3 basic format types. In the first format type 500, shown in FIG. 5A, X-Form operations are identified by a primary opcode field with value decimal 31, and are used to implement load and store instructions, as well as other instructions used to support memory access, such as lsvl and lsvr instructions. In accordance with the X-Form format, there is provided a secondary (or extended) opcode field (labeled as extended opcode XO field) from bits 21 to 30. In addition, there are provided 3 register specifier fields, for one VMX source operand (for store instructions) or target operand (for load or compute permute control word instructions) in register specifier field VT from bits 6 to 10, and two general purpose register specifier fields, ranging from bits 11-15, and bits 16-20.

In the second format type 530, shown in FIG. 5B, VA-Form operations are identified by a primary opcode with value decimal 4 and a subset of XO field bits, and are used to implement 4 operand VMX operations, such as permute, select and fused-multiply-add operations (and so forth), all having 3 vector register input operands and one vector register output operand, as well as some shift and other rotate by immediate operations, having one immediate and 2 vector register input operands, and one vector output operand. In accordance with this format, the instruction has an XO-field (labeled as extended opcode XO field) ranging from bits 26 to 31.

In the third format type 560, shown in FIG. 5C, VX-Form operations are identified by a primary opcode with value decimal 4 and a subset of XO field bits, and are used to implement 3 operand VMX operations, such as arithmetic and logical operations, compare, and so forth. The VX form has an extended opcode XO-field (labeled as extended opcode XO field) ranging from bits 21 to 31. In addition, the VX format has a vector register target specifier field VT in bits 16-10, and two source operand specifiers in bits 11-15, and bits 16-20, which can be used to specify either a vector register input, or a signed or unsigned immediate constant operand, based on the particular XO format selected by the value of the XO field.

SUMMARY

The present invention is directed to methods for generating code for an architecture encoding an extended register specification.

According to an aspect of the present invention, there is provided a method for generating code for a fixed-width instruction set. The method includes identifying a non-contiguous register specifier. The method further includes generating a fixed-width instruction word that includes the non-contiguous register specifier.

According to another aspect of the present invention, there is provided a method for compiling a program to use an extended register specification. The method includes specifying a subset of physical registers using a first set of instructions. The subset of physical registers corresponds to a set of physical registers specified by a second set of instructions. The first set of instructions are for encoding a set of semantics in accordance with an instruction set specification such that the set of semantics are capable of being encoded only by the first set of instructions. The method further includes performing register coloring by allocating a respective symbolic register from a set of symbolic registers to a respective register class from a set of register classes based on an operation of an intermediate language that references the respective symbolic register as an operand. The register coloring is performed for each of the symbolic registers in the set. The set of register classes are hierarchically arranged. The set of symbolic registers are capable of being used with respect to the subset of physical registers, support encoding a subset of the set of semantics with the second set of instructions, and correspond to the extended register specification.

According to another aspect of the present invention, there is provided a computer program product including a computer usable medium having computer usable program code for generating code for a fixed-width instruction set. The computer program product includes computer usable program code for identifying a non-contiguous register specifier, and computer usable program code for generating a fixed-width instruction word that includes the non-contiguous register specifier.

These and other objects, features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 5 is a diagram illustrating VMX instruction encodings in accordance with the prior art;

FIGS. 15A, 15B, and 15C are diagrams illustrating novel instruction encodings with an extended VMX specification in accordance with the present invention;

FIGS. 16A, 16B, 16C, and 16D are diagrams illustrating novel instruction encodings in a unit having 64 registers in accordance with the present invention;

DETAILED DESCRIPTION OF PREFERRED EMBODIMENTS

Figure 1A:
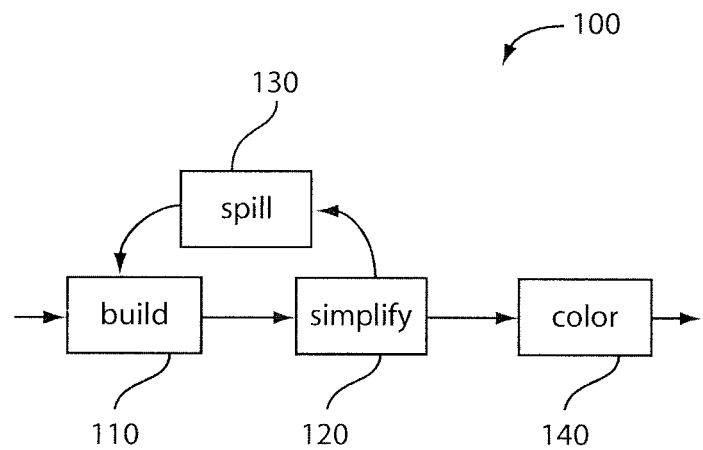
FIG. 1A is a diagram illustrating a register allocation algorithm in accordance with the prior art.

The present invention is directed to methods for generating code for an architecture encoding an extended register specification.

It is to be appreciated that while the methods set forth herein are based on an exemplary extended register specification for the VMX2 instruction set and its VMX128 subset, those skilled in this and related arts will readily understand how to apply the principles taught herein to other extended register specifications, such as those targeting, but not limited to, scalar data processing.

It should be understood that the elements shown in the FIGURES may be implemented in various forms of hardware, software or combinations thereof. Preferably, these elements are implemented in software on one or more appropriately programmed general-purpose digital computers having a processor and memory and input/output interfaces.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 6:
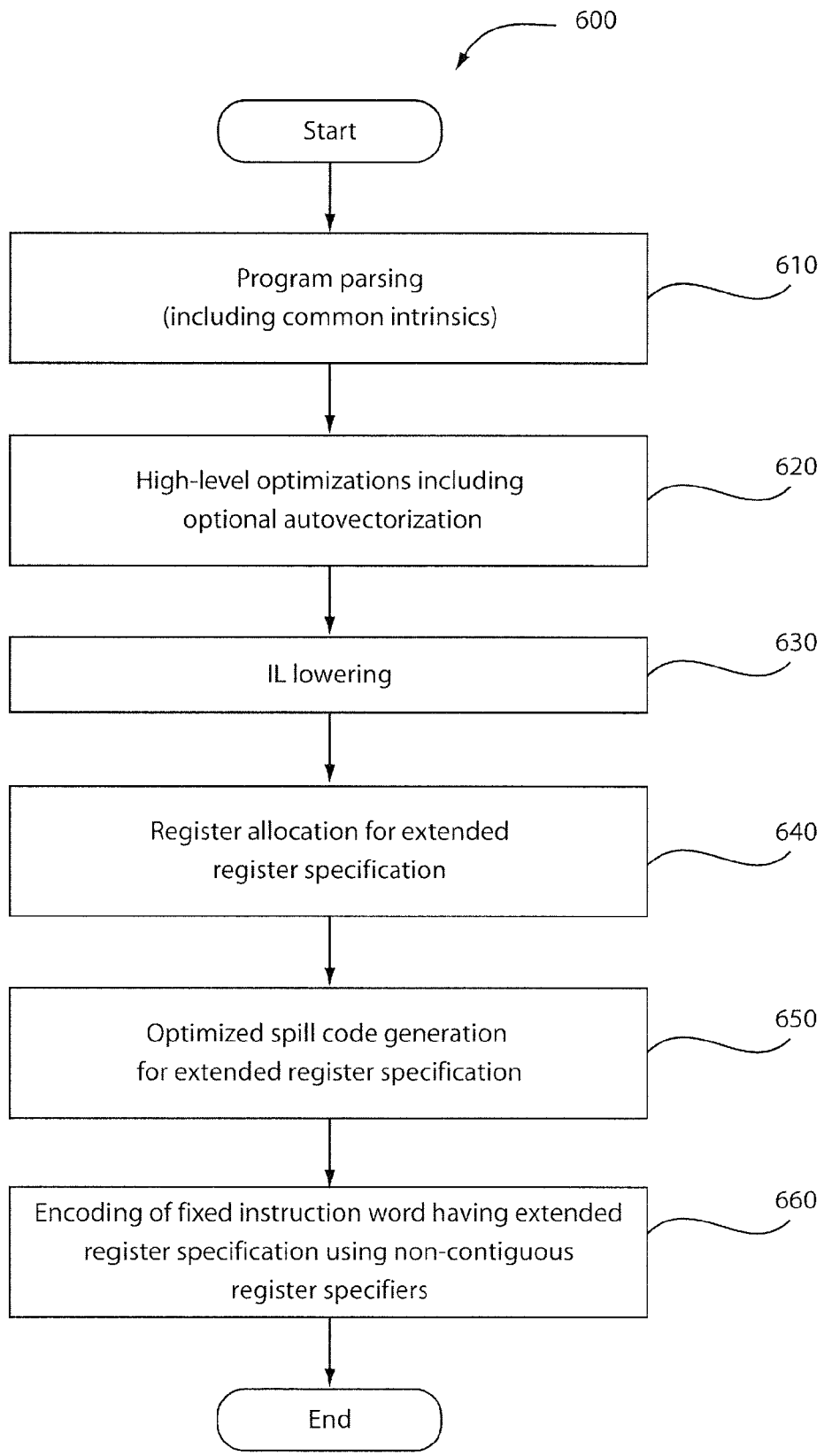
FIG. 6 is a diagram illustrating code generation method for extended register specification in accordance with the present invention.

Turning to FIG. 6, a code generating method for a microprocessor supporting an extended register specification in accordance with an exemplary extended register specification for the VMX2 instruction set is indicated generally by the reference numeral 600. The method starts with step 610. In step 610, the program is parsed. In accordance with the present invention, an embodiment thereof uses common intrinsics ("generic intrinsics") to specify semantic operations regardless of their encoding to use an extended or non-extended specification. This embodiment provides generic intrinsics as a method of abstracting the internal encodings. In another embodiment, intrinsics selecting a specific encoding are provided in addition to or in lieu of the generic intrinsics.

An intrinsic is a pseudo-function that maps into one or more internal machine operations allowing the specification of machine operation semantics otherwise not supported by a programming language.

Note that as used herein the term "generic intrinsic" refers to an intrinsic that is generic in terms of the encoding form and register constraints. In some other contexts, non-polymorphic intrinsics are referred to as "generic" which is different in meaning, as shall be shown herein below during the discussion of polymorphic intrinsics.

In step 620, a variety of high level optimizations are performed. Such optimizations may include those described in the prior art. The optimizations can include high-level autovectorization, wherein vector code is generated from a sequence of scalar operations, e.g., based on the framework described by Larsen et al., in "Exploiting Superword Level Parallelism with Multimedia Instruction Sets, Proceedings of the ACM SIGPLAN 2000 Conference on Programming Language Design and Implementation (PLDI), Vancouver, BC, June 2000, or by Eichenberger et al., Vectorization for SIMD Architectures with Alignment Constraints, Conference on Programming Language Design and Implementation Proceedings of the ACM SIGPLAN 2004 conference on Programming Language Design and Implementation, Washington, D.C., US, pp. 82-93, 2004.

In step 630, an intermediate language (IL, also known as intermediate representation IR) lowering step is performed. This can include specific optimizations to increase efficient use of vperm and load left/right primitives as described herein below for handling unaligned memory accesses according to the principles of the present invention.

In step 640, register allocation is performed in accordance with an improved register allocation algorithm for an extended register specification.

In step 650, optimized spill code is generated in accordance with an extended register specification.

In step 660, instructions are encoded using a novel encoding mechanism (see FIG. 17) for fixed instruction words to support the encoding of fixed width instruction words with register specifiers using a non-contiguous register specification. The method ends after step 660.

Figure 7:
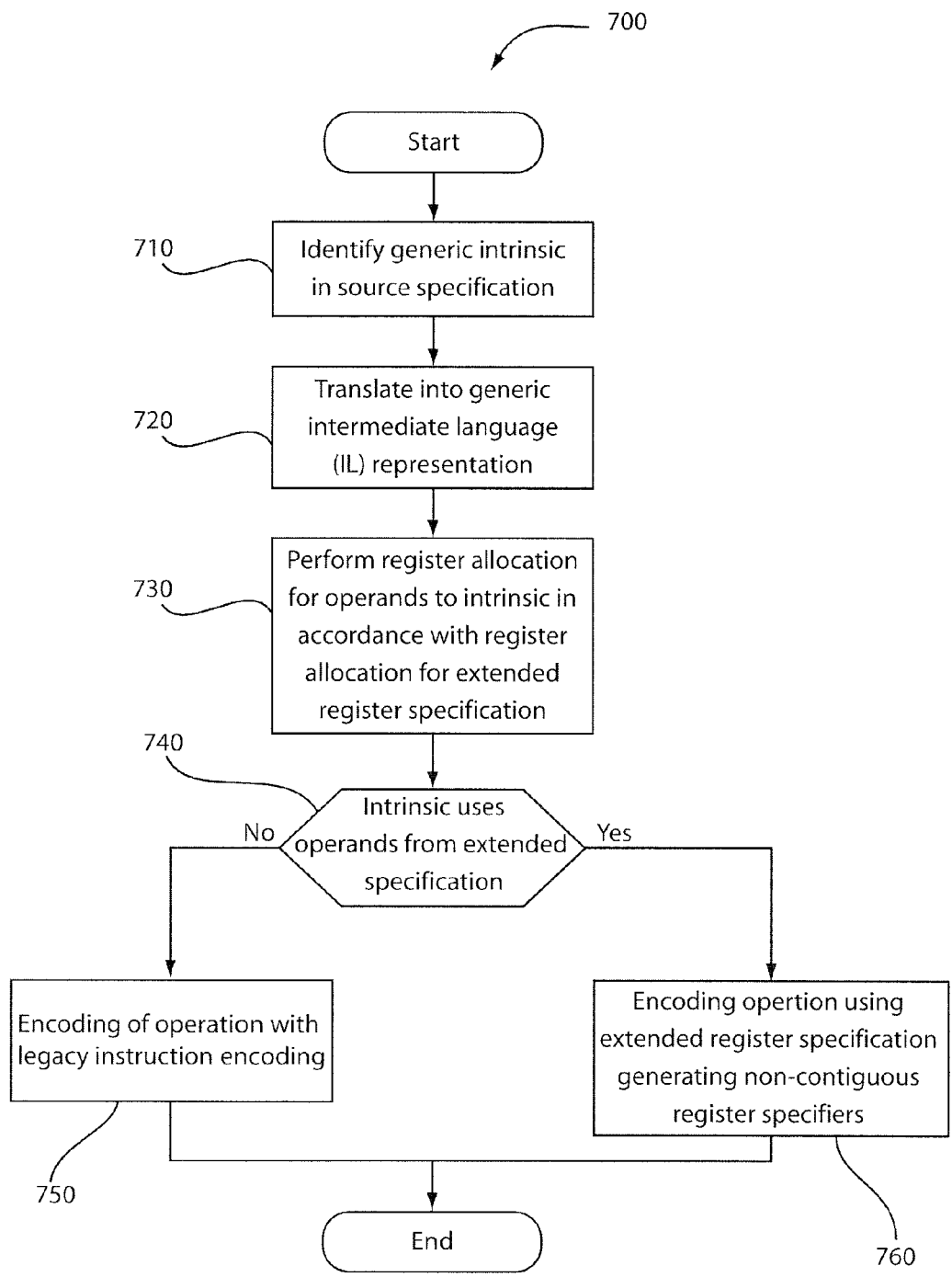
FIG. 7 is a diagram illustrating the processing of generic intrinsics in accordance with the present invention.

Turning to FIG. 7, a method for processing generic intrinsics is indicated generally by the reference numeral 700. In step 710, a generic intrinsic is identified in the source specification. In step 720, the generic intrinsic is translated to a generic intermediate language (IL) representation.

In step 730, there is performed register allocation for the operands used by the present intrinsic in accordance with the enhanced register allocation for the extended register specification. Specifically, the register allocator only generates register allocations that correspond to one of the legal specific intrinsic specifications to which a generic intrinsics can be mapped.

In step 740, a test is performed to identify if the generic intrinsic maps to an instruction encoding in accordance with the legacy specification, or with the optimized fixed width instruction extended register specification. This test depends on using a register allocator in accordance with the principles of the present invention, or another register allocator equipped to understand register allocation constraints on possible operand combinations in accordance with the extended register specification in accordance with the principles of the present invention, to generate only those operand combinations which can be represented using either a first legacy form or a second extended specification form.

If the intrinsic corresponds to an instruction using the first encoding, control transfers to step 750. If the intrinsic maps to an instruction using the optimized fixed instruction word extended register specification, control transfers to step 760. If an intrinsic can be encoded both using the known (i.e., prior art) and optimized encodings, an embodiment will generate the optimized encoding. In another embodiment, the known encoding is used.

In step 750, the intrinsic is encoded using an instruction encoding in accordance with prior art.

In step 760, the intrinsic is encoded using an optimized fixed width instruction with extended register specification by generating non-contiguous register specifiers. The method terminates after steps 750 and 760, respectively.

Those skilled in the art will understand that embodiments described herein can be combined with the provision of specific intrinsics, wherein the programmer can specify via those specific intrinsics the use of the legacy or extended register set, for selected operations.

Whereas the above description focuses on the selection between a first (legacy) encoding and a second (optimized fixed instruction word extended register specification) encoding, to those skilled in the art, it will be apparent that this method can be extended to allow multiple (optimized) encodings and a selection mechanism between these several encodings in a method consistent with the exemplar described above.

Figure 4:
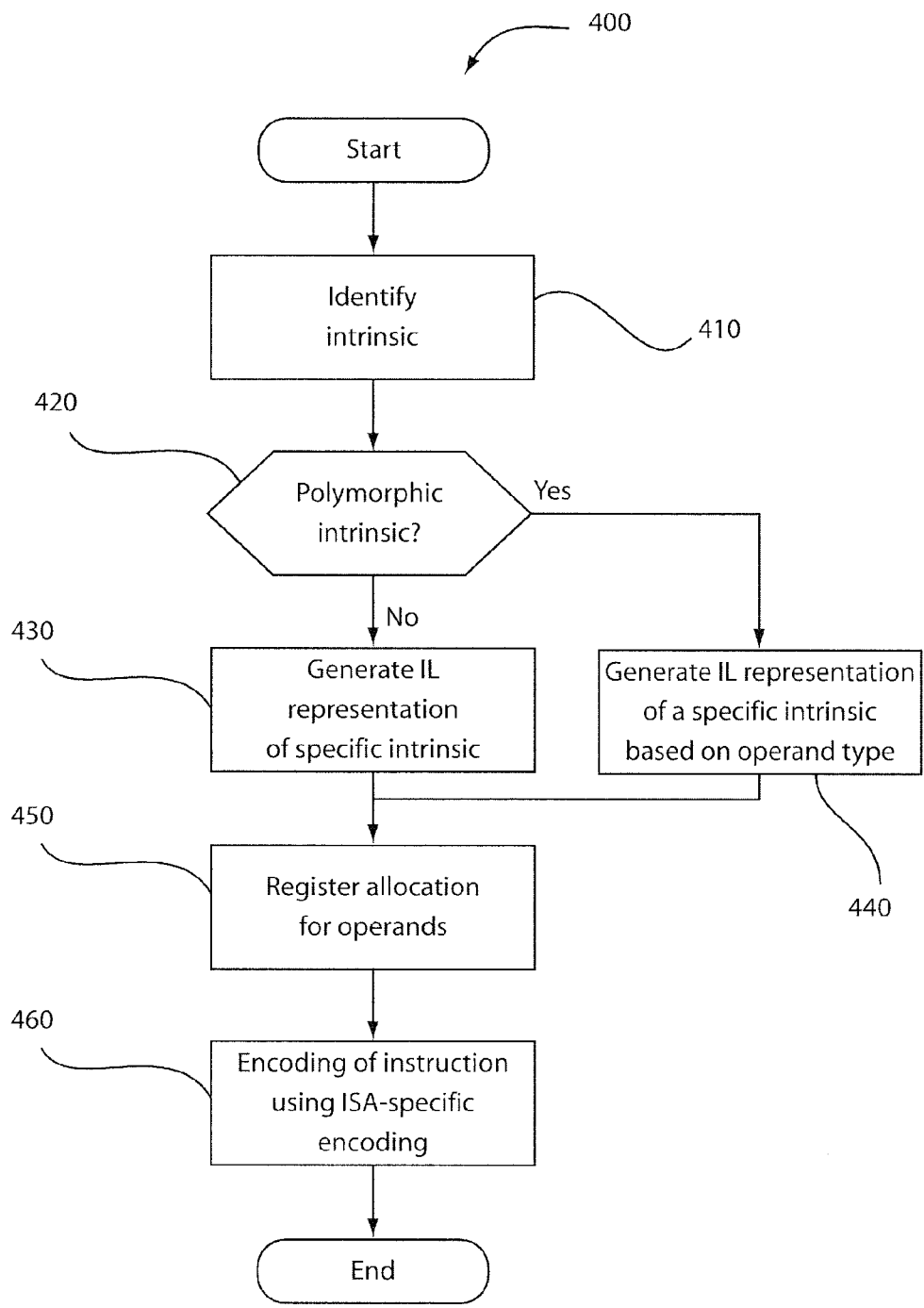
FIG. 4 is a diagram illustrating handling of polymorphic intrinsics in accordance with the prior art.

In accordance with another embodiment, there are provided polymorphic generic intrinsics, advantageously allowing the specification of operation semantics using the data type system, and the selection of the specific operation based on an improved register allocation phase. Combining the advantageous aspects of the methods of FIGS. 4 and 7 has so far eluded those skilled in the art.

Figure 8:
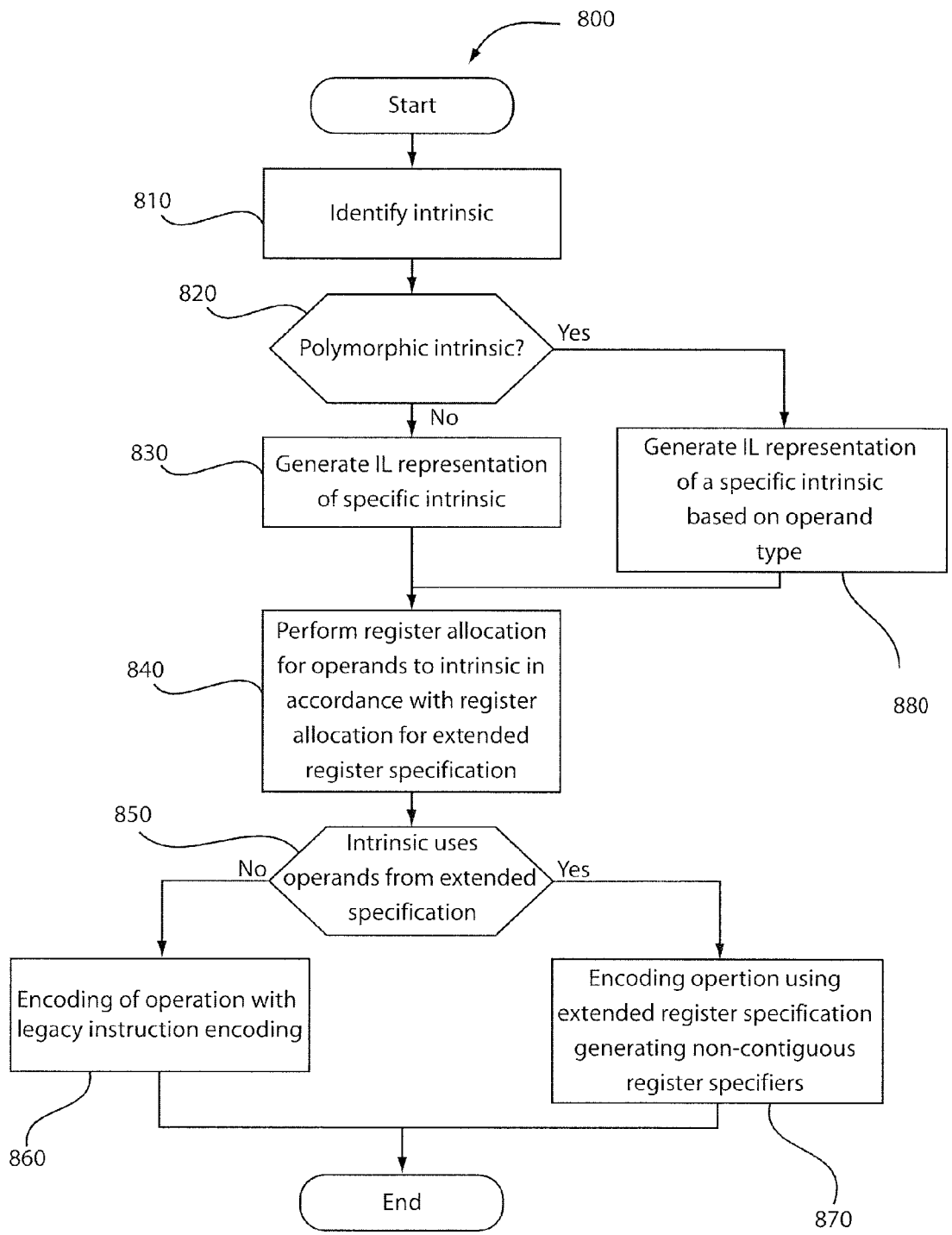
FIG. 8 is a diagram illustrating the processing of polymorphic generic intrinsics in accordance with the present invention.

Turning to FIG. 8, a method for providing polymorphic generic intrinsics is indicated generally by the reference numeral 800.

At step 810, an intrinsic is identified, and control passes to step 820. At step 820, a test is performed to determine whether or not the intrinsic is a polymorphic intrinsic. If the intrinsic represents a polymorphic intrinsic, then control passes to step 880. Otherwise, control passes to step 830.

At step 830, an intrinsic is translated to an internal language (IL, or internal representation IR) form, and control passes to step 840.

At step 880, a polymorphic intrinsic is translated to a specific intrinsic based on operand type (or other such information as may be used to map a polymorphic intrinsic to a specific intrinsic), and control passes to step 840.

At step 840, register allocation is performed in accordance with the present invention to perform register allocation for an extended register specification, and control passes to step 850.

At step 850, a determination is made whether or not the intrinsic uses operands from the extended specification. If the intrinsic has been allocated to use only registers of the non-extended set, then control passes to step 860. Otherwise, if the intrinsic has been allocated to use at least one register of the extended set, then control passes to step 870.

At step 860, an encoding step in accordance with prior art is performed to generate a legacy instruction encoding, and the method is terminated.

At step 870, an encoding step in accordance with the present invention is performed to encode an instruction with an extended register specification. In at least one embodiment, the generation of an encoding with an extended specification involves an encoding step generating an instruction word with a non-contiguous register specifier(s) (as shown in FIG. 17), and the method is terminated.

Figure 9:
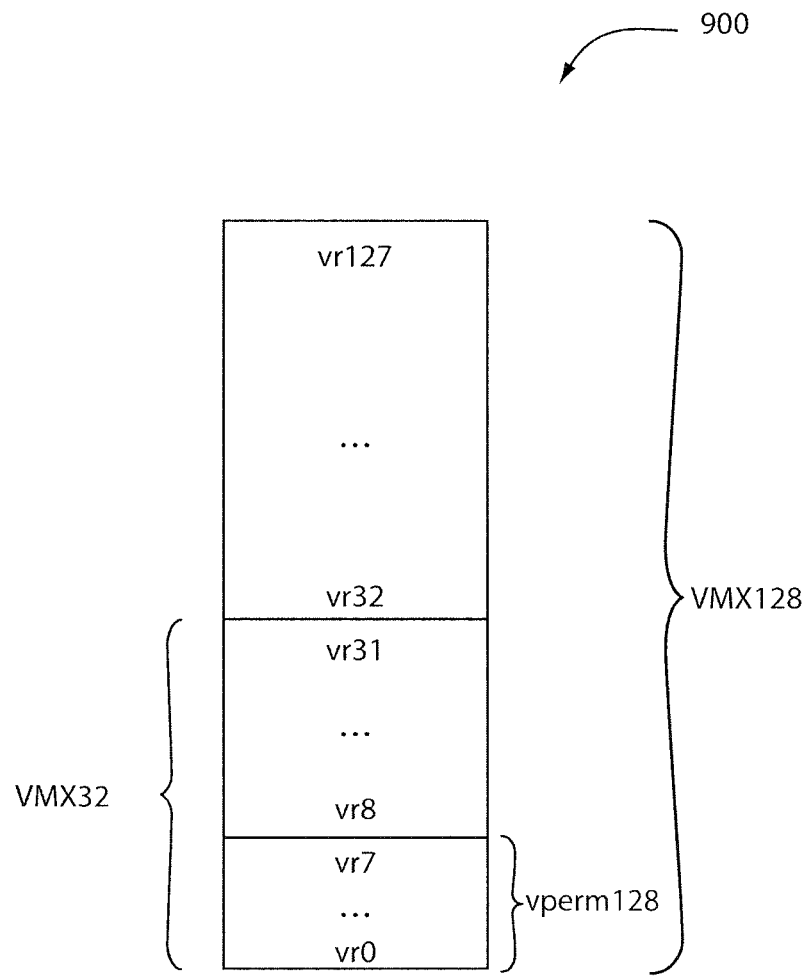
FIG. 9 is a diagram illustrating register addressability in VMX2 in accordance with the present invention.

Turning to FIG. 9, an extended register specification is indicated generally by the reference numeral 900. The specification 900 of FIG. 9 will be described with respect to an improved method for allocating registers in accordance with the extended register specification. A register from the intermediate representation can be referenced by an operation using an operand from registers vr0 to vr7 (specifically, if the register is an operand to the vperm128 instruction), by registers vr0 to vr31 (if the register is an operand to an operation only available as a 32 register variant) or by registers vr0-vr128.

Figure 10:
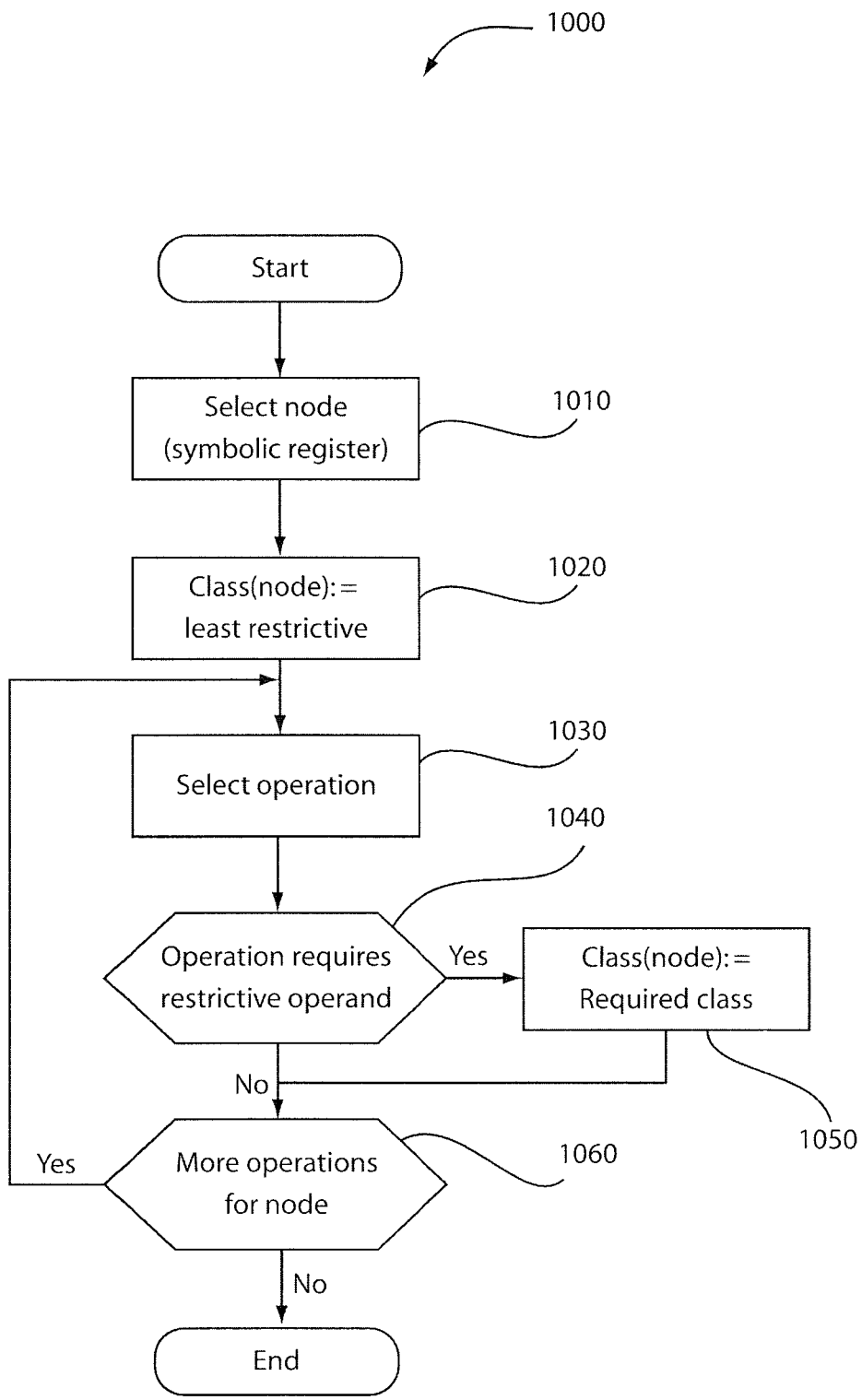
FIG. 10 is a diagram illustrating steps for identifying a required class for each node in accordance with the present invention.

In accordance with an embodiment, each register is associated with a single register class representing its most restrictive operand. Since each more restrictive operand is also a legal operand for all operations that have to use a less restrictive operand, each operand can be represented as requiring just a single class, of its most restrictive associated operation. A method for assigning a required class in accordance the register specification of FIG. 9 is shown in FIG. 10. The method of FIG. 10 is performed before performing the register allocation method (e.g., based on the conceptual flow of FIG. 1A or FIG. 1B) in accordance with the principles of the present invention to prepare appropriate class association used by the colorability test.

Turning to FIG. 10, a method for identifying a required class for each node is indicated generally by the reference numeral 1000.

At step 1010, a first node of the graph (corresponding to a symbolic register) is selected, and control passes to step 1020.

At step 1020, an initial class is allocated to the selected node, and control is passed to step 1030. In at least one embodiment, the selected node is the least restrictive class.

At step 1030, an operation referencing the node is selected, and control passes to step 1040.

At step 1040, a test is performed to identify whether or not an operation requires a more restrictive operand. If a more restrictive operand requirement is required, then control is passed to step 1050. Otherwise, control passes to step 1060.

At step 1050, the class allocated to the node is adjusted to represent a more restrictive operand requirement, and control passes to step 1060.

At step 1060, a test is performed to determine whether or not an additional operation(s) references this node. If the test indicates that an additional operation(s) references this node, then control is returned to step 1030 to select the next operation referencing the current node.

The method terminates when all operations referencing the current node have been processed.

Those skilled in the art will understand how to apply the teachings of the method 1000 of FIG. 10 to other extended register set specifications.

Figure 11:
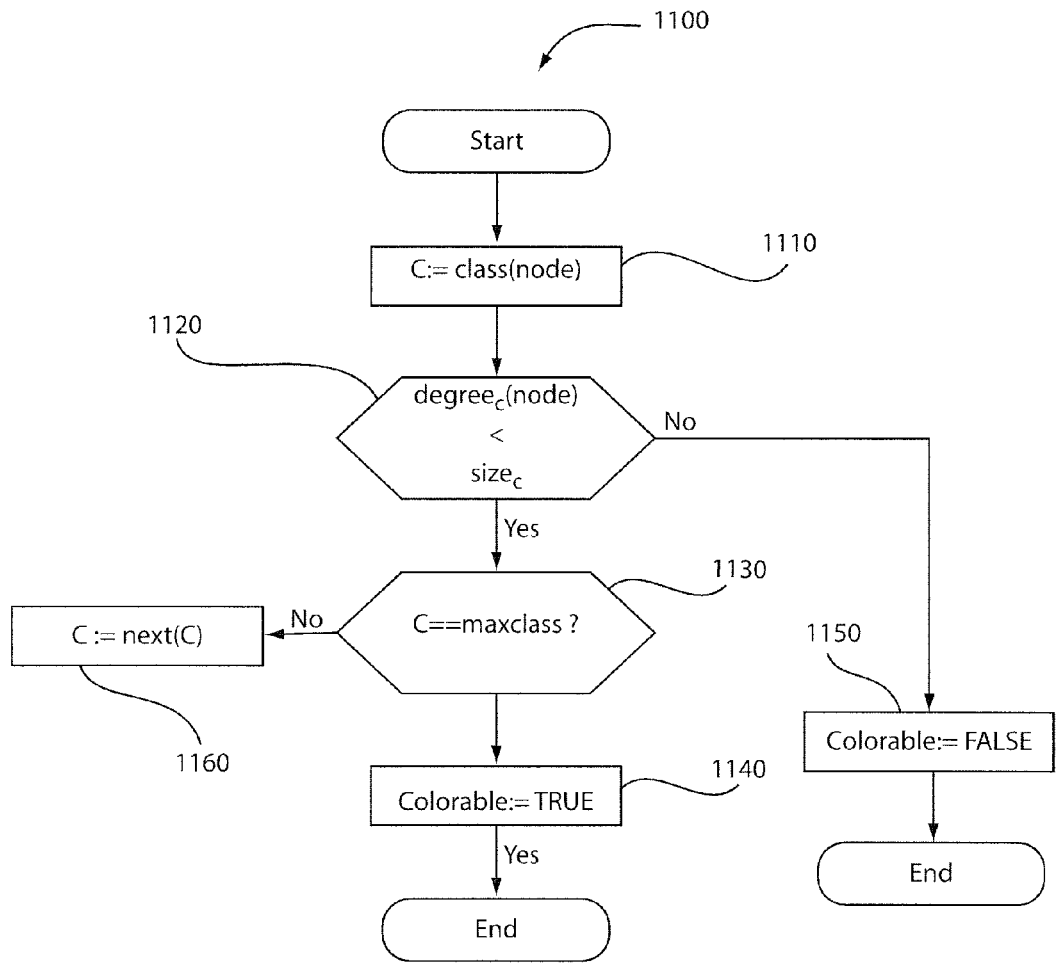
FIG. 11 is a diagram illustrating an improved colorability test for use in accordance with the present invention.

Turning to FIG. 11, a colorability test is indicated generally by the reference numeral 1100. The colorability test 1100 may be used in conjunction with the simplify phase of FIG. 2. The improved colorability test is adapted to an extended register specification, and after each node has been associated with a required class in accordance with FIG. 10.

In FIG. 11, $degree_C$(node) specifically refers to the number of neighbors in the class C (and smaller classes wholly included therein), $size_C$ refers to the number of registers included in such class.

At step 1110, the class required for a node to be tested for colorability is determined and assigned to a variable C representing a coloring class, and control is passed to step 1120.

At step 1120, a test is performed to determine whether or not the degree of the node with respect to class C is less than the size of class C. If the test is successful, the node is colorable with respect to class C, and control passes to step 1130. If the test fails, the node is not colorable with respect to class C, and control passes to step 1150.

At step 1130, a test is performed to determine whether or not the class represented by variable C is the maximum encompassing class representing all registers for an extended register specification. If not, then control passes to step 1160. Otherwise, all register classes have been tested, and control passes to step 1140.

At step 1160, the next encompassing class of the class represented by variable C is determined, variable C is updated, and control passes to step 1120.

At step 1140, it has been determined whether or not the node is colorable with respect to its required class, and all its superclasses, and, thus, colorability is indicated, and the method terminates.

At step 1150, the node has failed the colorability test for at least one class of its required class and all its superclasses and, thus, non-colorability is indicated, and the method terminates.

In other words, in accordance with the present specification, there is performed a test for each class in which a register falls, whether the number of neighbors also wholly within the class is less than the size of the register class.

While FIG. 11 gives a general test, an extended register specification in accordance for a fixed width RISC instruction set usually has only a small set of register classes, such as 2 or three classes. Specializing the conditions of FIG. 11 allows simplification of this colorability test to further improve its speed in accordance with the principles of the present invention.

Figure 12A:
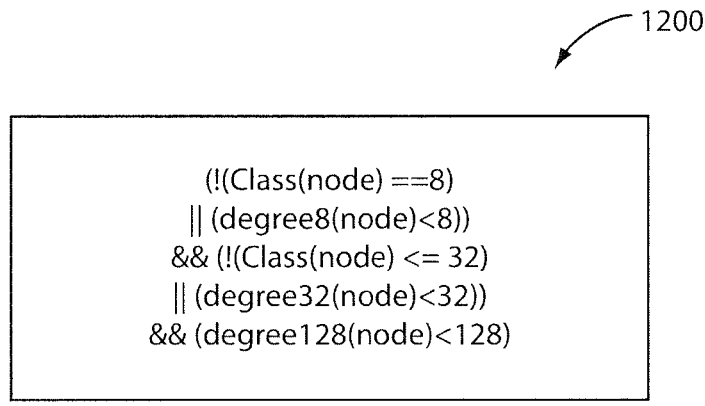
FIG. 12A is a diagram illustrating a simplified colorability test for a 3 class system in accordance with FIG. 16 in accordance with the present invention.

Referring now to FIG. 12A there is shown a simplified colorability test 1200 for a 3 class system in accordance with FIG. 9 wherein class "8" refers to the class including vperm128 operands, class "32" refers to the class of the VMX32 register specification, and class "128" corresponds to the extended VMX128 register specification. In accordance with this specification, degree8 returns the number of neighbors in the "8" class vperm set, degree32 the number of neighbors in the "32" class VMX32 specification set, and degree128 the number of total neighbors.

Figure 12B:
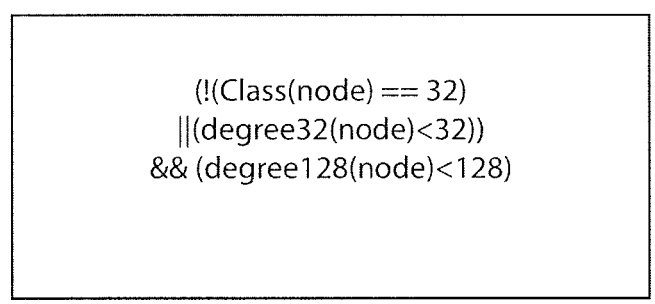
FIG. 12B is a diagram illustrating a simplified colorability test for a 2 class system in accordance with FIG. 16 in accordance with the present invention.

In FIG. 12B, there is shown a simplified colorability test 1250 for a 2 class system in accordance with FIG. 9, but excluding the vperm128 operands, wherein class "32" refers to the class of the VMX32 register specification, and class "128" corresponds to the extended VMX128 register specification.

While the extended register specification included herein has three classes, we will describe a method to specially handle the vperm operation, so as to reduce the allocation process to that of a 2 class system, thereby advantageously reducing the complexity of the colorability test, and addressing other aspects of the vperm instruction.

Referring now to the colorability test, a further optimization is presumed wherein a register node requiring a VMX32 register will be spilled into the VMX128 register set before being spilled to memory. Advantageously, using this spill strategy allows to use the larger register set to capture overflow for fast spill and restore, before accessing main memory.

If, however, the spill strategy were to immediately eject VMX32 operands to main storage when a VMX32 operand cannot be found, then the following, more aggressive colorability test (a modified test of FIG. 12B) would be used in conjunction with an embodiment of the present invention, to capture the constraint that the set of registers required to be allocated into the 32 register space can never consume more than 32 registers of the entire 128 entry register file:

```
(!(Class(node) == 32)
 || (degree32(node)<32))
  && ((degree128(node)-
degree32(node)+min(32,degree32(node))<128)
```

If this colorability test is used, vfmaddfp and associated operations described herein below are preferably handled by a coalescing phase before register allocation occurs to prevent the change of a VMX32 class register into the VMX128 class register, thus subverting this colorability test. Those skilled in the art will understand how to apply this optimization to the tests of FIGS. 11 and 12B in accordance with the teachings set forth herein.

Figure 2:
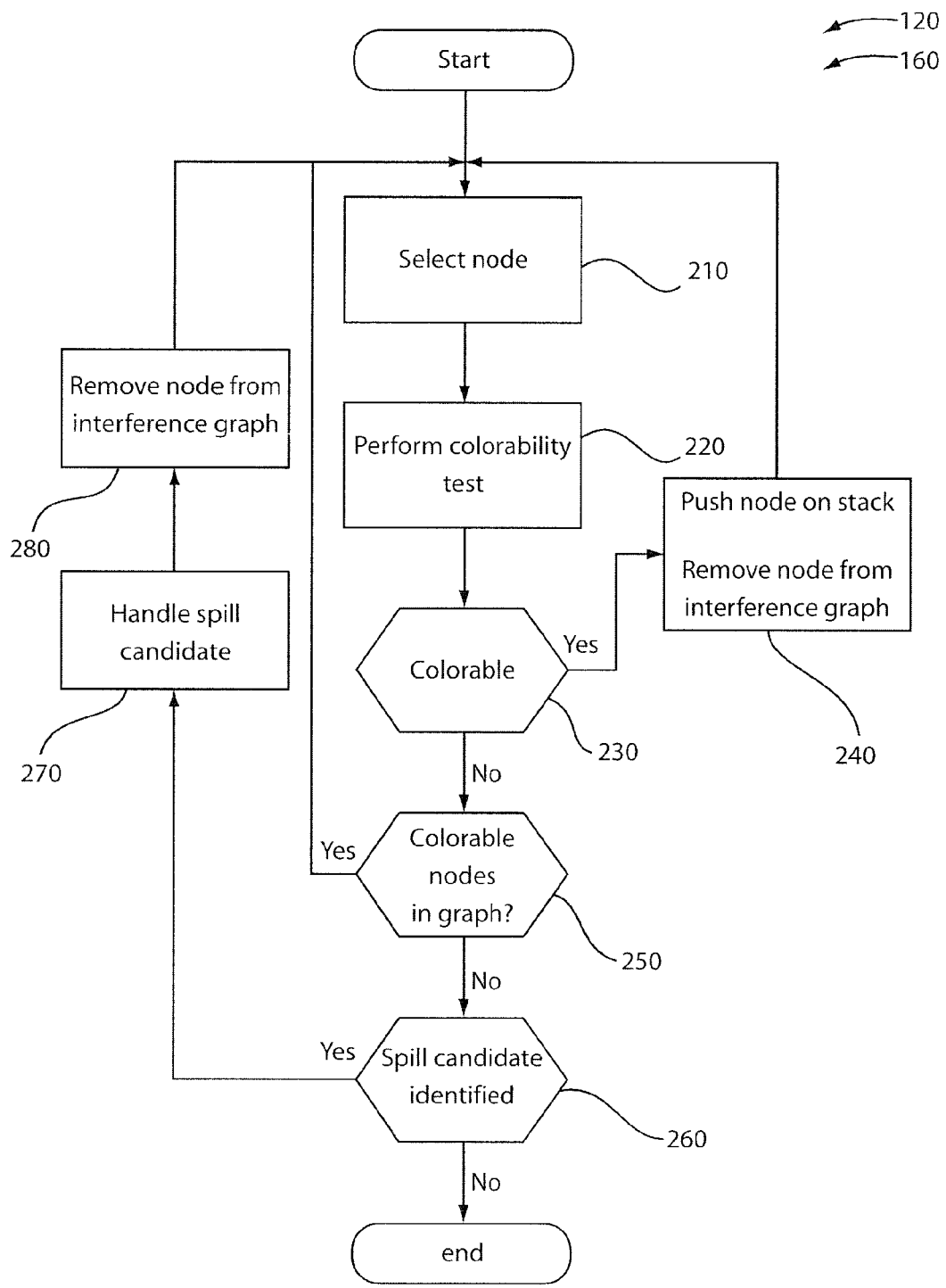
FIG. 2 is a diagram illustrating steps of a graph-coloring register allocator in accordance with the prior art.
Figure 3:
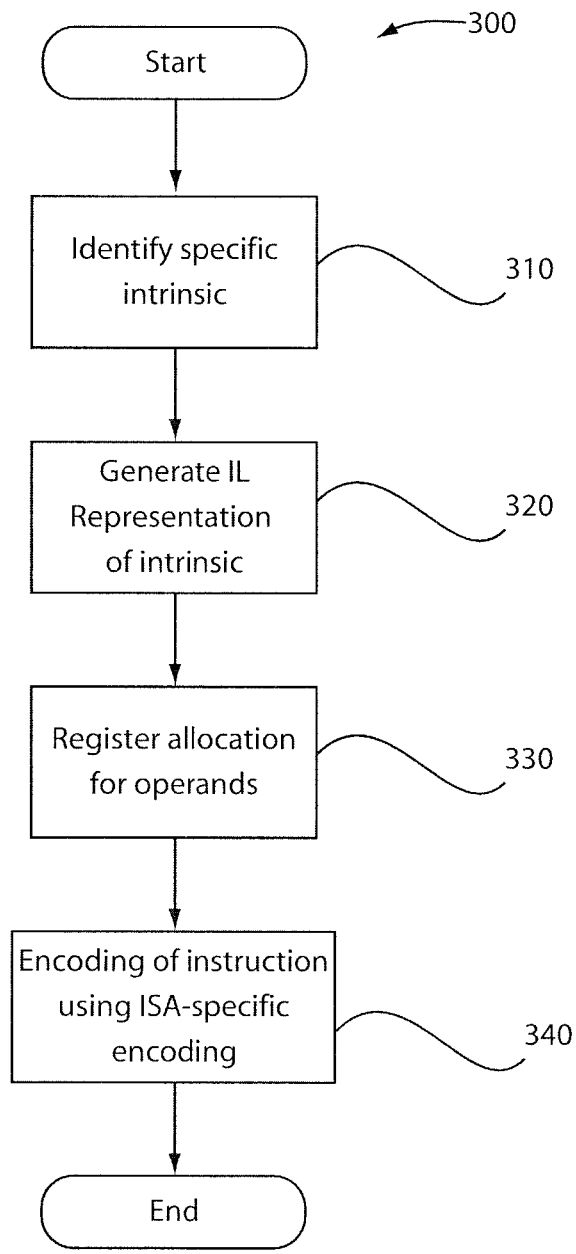
FIG. 3 is a diagram illustrating handling of intrinsics in accordance with the prior art.

In another embodiment, applicable towards using the VMX128 extended register specification for spilling operands required in the VMX32 register set, live range splitting is used to address the situation of FIG. 2 wherein no node can be colored, in accordance with the method described by Chow et al. in the above-referenced article entitled "Register Allocation by Priority-Based Coloring". In accordance with the method of handling spill code, a live range is split to improve colorability.

In accordance with the method described by Chow et al. in the above-referenced article entitled "Register Allocation by Priority-Based Coloring", a maximum size live range is generated. However, in one embodiment in accordance with the principles of the present invention, the live range splitting algorithm is optimized to split a live range associated with a smaller register class into at least one live range capable of being allocated to a larger class. This is accomplished by modifying the live range splitting logic of step ii of the method described by Chow et al. in the above-referenced article entitled "Register Allocation by Priority-Based Coloring", to select a "target class" bigger than the current class for a newly created live range and to add blocks adjacent to in that also belong to lr successively, updating the neighbors in the interference graph until the number of colored neighbors of lr1 in the interference graph is one less than the number of available colors in the target class of the live range for lrl1 and a more restrictive class does not have to be selected due to the constraints imposed by a specific block.

Referring now to the handling of certain operations, and specifically, the vmaddfp and associated operations that may occur either in a constraint-free form using the VMX32 register class, or in an update form in the VMX128 class. The latter use is consistent with common applications of the fused-multiply-add primitive, e.g., in commonly used matrix-multiply operations and other uses in the popular BLAS package (Basic Linear Algebra Subprograms).

In accordance with a preferred embodiment, the operands of the vfmaddfp (and similar operations) are marked to require operands in the VM32 register space. In accordance with a node merging step, source and target operands of vfmaddfp (and other update form VMX128 operands) are repeatedly merged to unify the allocation of a source and target operand specified as update form in the instruction set architecture.

Specifically, the VMX128 specification includes several instruction forms allowing different source operands to be combined with a target to improve the merging process's freedom of action in choosing what registers to merge. Whereas in merge operations previously disclosed, merging was only advantageous if there was substantial overlap between the neighbors of two nodes in the graph being merged, node merging for sources and targets is immediately advantageous for a vfmaddfp instruction because successful merging relaxes its operand constraints, possibly allowing one or more of its operands to be allocated to the bigger VMX128 class.

To update the constraints of each node, in one optimized embodiment, a count of operations restricting the node to a specific class is maintained. When an operation relaxes the constraint, this constraint count constraints$_C$(node) is decremented. When the constraint count of a node for class C reaches 0, its constraint count can be relaxed to the next surrounding class having a non-zero constraint count.

In one embodiment, node merges are executed repeatedly before a node needs to be spilled, in the hope of finding a node which can be colored in a larger class, thus opening up additional coloring opportunities. In another embodiment, node merges are performed in a pre-pass to the initial class assignment. In one embodiment targeted at increasing the number of nodes which can be allocated to the VM128 registers, copy operations are inserted before operations eligible to use update forms in the VMX128 set, to facilitate node merge operations. Spuriously introduced copy operations are then removed in accordance with one or more known coalescing methods.

Figure 1B:
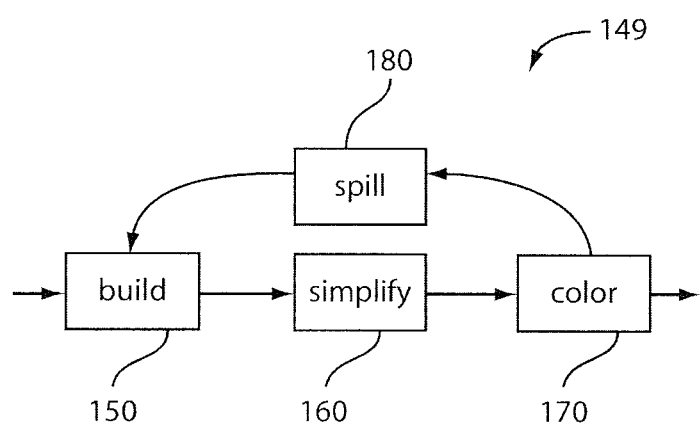
FIG. 1B is a diagram illustrating an improved register allocation algorithm in accordance with the prior art.

Referring now to the final coloring step of FIGS. 1A and 1B, and specifically to the register allocation in accordance with the above-referenced article by Briggs entitled "Coloring Heuristics for Register Allocation", a test is performed for each node to be allocated, to identify the least constrained register class for allocation. This allows retention of a maximum number of more constrained registers to allocate to the more constrained nodes and, thus, increases the chance of providing a good coloring in accordance with the observations of Briggs.

Having thus set forth a general framework for dealing with extended register specifications including, but not limited to, those of FIG. 9, and specifically the VMX128 extended register specification, we now turn to address specific optimization opportunities associated with the specific operation repertoire found in this architectural specification.

Specifically, in accordance with one optimized implementation, the vperm operation is generated to handle (possibly) unaligned data during the IL lowering step 630 of FIG. 6. In accordance with the number of memory accesses performed by successive possibly misaligned operations, and total numbers of operations executed, using the permute operation is preferable to some other methods (in particular, if the control word can be computed only once in a loop preheader), as successive accesses to a stream can be reduced to a single lvx/vperm pair:

```
Assumptions:
# Rb != 0 and contents of Rb = 0xB
lvx128    Vhi,0,Rb          #load MSQ
lvsl      Vp,0,Rb           # set permute control vector
addi      Rb,Rb,16          # address of LSQ
lvx128    Vlo,0,Rb          #load LSQ
vperm     Vt,Vhi,Vlo,Vp     # align the data
```

However, for performing a single isolated (possibly) unaligned VMX vector access from memory, a sequence based on the novel load vector left and load vector right instructions may be generated by a preferred embodiment of intermediate language (IL) lowering. In particular, this is advantageous because this sequence does not require a permute operation with the attendant VC permute control word, which is restricted to the first eight vector registers vr0 to vr7 in the vperm128 form.

Thus, in accordance with this preferred embodiment the following internal sequence is generated.

```
lvlx128   Vt_lower, 0, Rb    # load left portion of QW
addi      Rb, Rb, 16         # adjust address to next QW
lvrx128   Vt_upper, 0, Rb    # load right portion of QW
vor       Vt_merged, Vt_lower, Vt_upper  # merge left &
                                          right portions of QW
```

Specifically, the load left operation loads at most 16 bytes of data from a specified address to a specified boundary (16 bytes in the VMX128 implementation), and stores them in a vector register starting at byte 0. In accordance with the specification of the load right instruction, it loads byte data from the 16 byte boundary following the specified address to the specified address+15 (if any), and stores them in the vector register right-adjusted (i.e., the last loaded byte, if any, is stored in byte 15).

In one embodiment the vector load left and vector load right operations perform a read-modify-write cycle on the vector register. In another embodiment of these instructions, the non-loaded bytes are initialized to zero, and a final VOR operation (or other such combinational operation as VADD) is required to combine the two partial load results (as illustrated in the exemplary code sequence above).

In one embodiment, the load left and load right instructions are advantageously complemented by store left and store right instructions to simplify the storing of unaligned vector data, and to eliminate thread synchronization needs in multi-threaded applications when the threads operate on closely co-located unaligned vector data:

```
Assumptions:
# Rb != 0 and contents of Rb = 0xB
stvlx128  Vs,0,Rb     # store left-most portion of QW
addi      Rb,Rb,16    # adjust address: point to next QW
stvrx128  Vs,0,Rb     # store right-most portion of QW
```

In another aspect of the handling associated with the constraints imposed by the encoding of the vperm128 instruction, symbolic registers referenced as VC operands are pre-allocated (and optionally pre-split), to ensure that VT, VA, and VB operands can be allocated in the VMX128 register set in an embodiment. This is advantageous because of the limited number of VC registers available, and the importance of efficient access to streaming data to ensure high speed vector stream processing.

In another embodiment, VC spilling and reload, or re-materialization, is avoided altogether by judiciously modifying the intermediate representation to use sequences of load left/right when the VC operand cannot be allocated to a register.

In accordance with one micro-architectural implementation of the VMX128 register specification, as described in the above-referenced U.S. Pat. No. 7,421,56, entitled "Methods and Apparatus for Implementing Instruction Set Architectures with Non-Contiguous Register File Specifiers, conservative dependence checking is performed by comparing a subset of the register specifier bits to determine dependence/non-dependence. In accordance with one optimized code generation embodiment, register allocation in accordance with the "color" phase of FIGS. 1A and 1B is modified to select registers such that for each node being colored, the write of the selected color does not coincide, within a pre-defined window, with a successive read from an unassociated node mapping to the same dependence synonym class (i.e., where dependence is falsely detected and stall cycles inserted), or a read of the selected color with a pre-existing write to an unassociated node mapping to the same dependence synonym class.

While the description included herein has been made in accordance with an exemplary embodiment based on an extended register specification for a vector unit, the teachings included herein can be applied to other register extensions.

What is needed is an improved way to encode larger numbers of registers. Thus, an advantageous implementation of an extended register file set: (1) encodes the extended register set in the fixed width instruction word without extension to the instruction word width; (2) provides the ability to simultaneously access the entire extended instruction set in a single operation, for a substantial subset of the instruction operation repertoire; and (3) encodes each operand specifier independently for almost all operations, such that registers can be specified as operands independently in each operand position.

The first aspect offers the following advantages. In one advantage, addressing the CMODEX (concurrent modification and execution) issue in variable length instruction words, wherein a concurrent modification of instruction word during its execution can lead to incorrect results. This is an inherent problem in all CISC and other variable width instruction sets. In another advantage, the code density issue raised by a wider instruction word is resolved. In yet another advantage, the instruction alignment, decode and execution issues associated with variable instruction words are resolved. In a further advantage, an extended instruction set is provided to improve performance by directly specifying the addressed registers in the instruction word as a register specifier field.

The second aspect offers the following advantages. In one advantage, the use of the entire extended register set is allowed to speed up the execution of a single, single-threaded program. In another advantage, symmetric use for the extended register set is provided, wherein most extended registers can be used as substantially all operands in conjunction with a significant portion of the instruction operation repertoire with minimal restrictions. In yet another advantage, the compiler instruction selection and register allocation phases are simplified, thereby allowing the compiler more freedom of action to generate better schedules and register allocation maps. In a further advantage, simpler implementations may be utilized with orthogonal, streamlined operand decoding logic.

The third aspect offers the following advantages. In one advantage, orthogonal operand use is provided to simplify programming. In another advantage, symmetric use for the extended register set is provided, wherein most extended registers can be used as substantially all operands independently of the use of other operands, in conjunction with a significant portion of the instruction operation repertoire with minimal restrictions. In yet another advantage, the compiler instruction selection and register allocation phases are simplified, thereby allowing the compiler more freedom of action to generate better schedules and register allocation maps. In a further advantage, simpler implementations may be used with orthogonal, streamlined operand decoding logic.

In accordance with a preferred implementation of an orthogonal extended register file set for a fixed width instruction word, additional bits for specifying a register operand are provided.

In the examples and exemplary embodiments, the VMX2 instruction set specification, which provides the advantageous properties described herein, is employed. In accordance with the VMX2 instruction set specification, the register file size and operational repertoire are extended. In a subset of the VMX2 specification, the VMX128 instruction set specification subset of VMX2 provides an extension of the number of registers available in the instruction word, while substantially maintaining the instruction operation repertoire file (with the addition of optimized operations for multimedia processing).

Figure 13A:
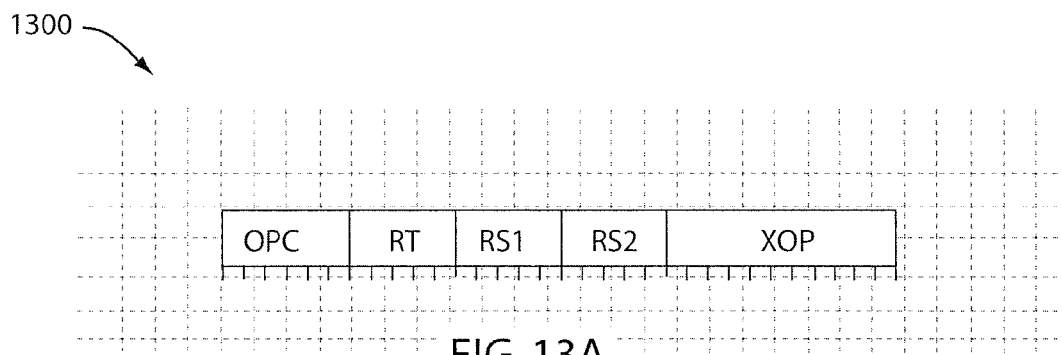
FIGS. 13A and 13B are diagrams illustrating the alignment of 5 bit register operand registers with 7 bit register operand specifiers in accordance with the prior art and the present invention, respectively.
Figure 13B:
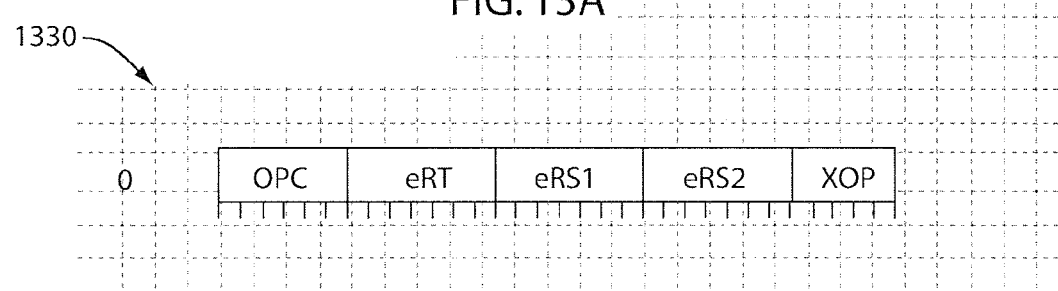

Having thus put forward the encoding of the advanced VMX vector media extension architecture with thirty-two 128b vector registers, it is desirable to extend the operation repertoire to include an extended set of operations, and to allow the addressing of more operands. Having further put forward the need to maintain a fixed-width RISC ISA, an initial naïve extension of the register file to support 128 registers might be encoded by providing wide 7 bit register specifier fields to indicate one of 128 registers, in accordance with FIG. 13B. Turning to FIGS. 13A and 13B, alignments of 5 bit register operand registers with 7 bit register operand specifiers in accordance with the prior art and the principles of the present invention are indicated generally by the reference numerals 1300 and 1330, respectively. While wide specifiers in contiguous fields are desirable in extensions devoid of legacy instruction support, they are not advantageous in modern extensions of architectures having pre-existing instruction words using short specifiers.

Figure 13C:
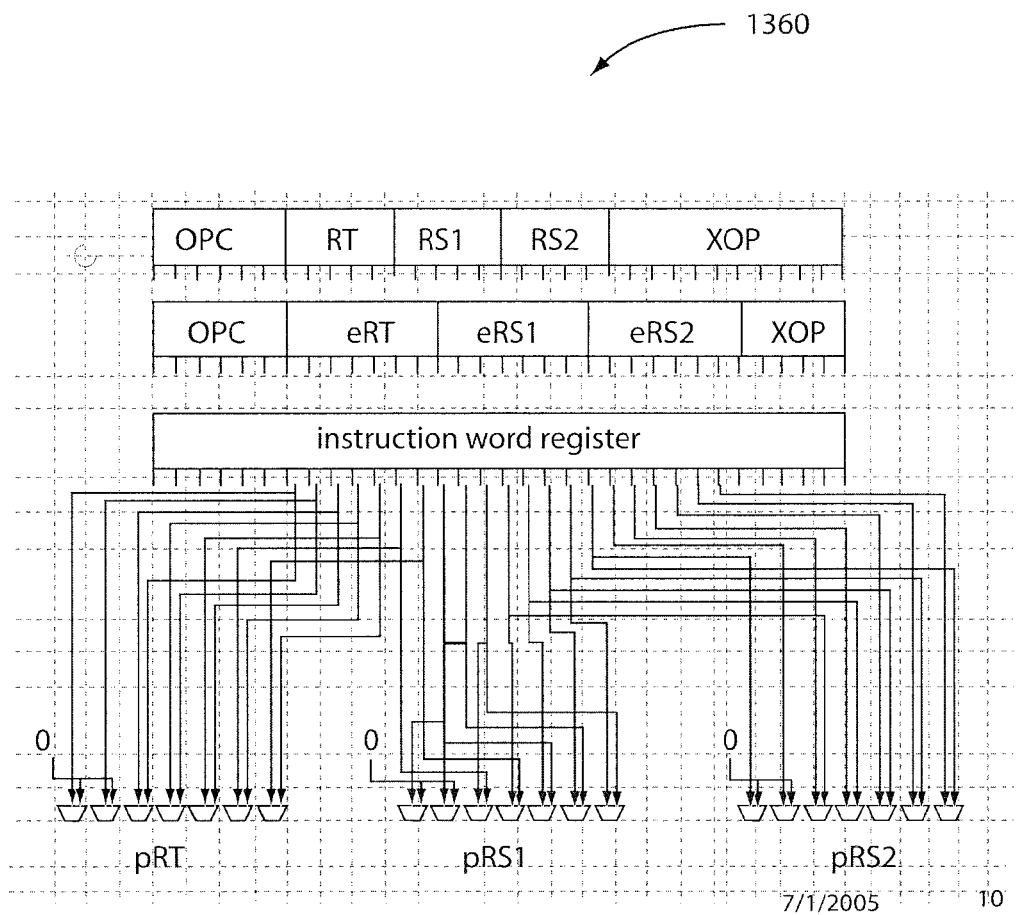
FIG. 13C is a diagram illustrating a result of extending a register file specification by using wide register specifiers, specifically the impact on routing during the instruction decode phase in accordance with the present invention.

Alas, such an attempt at extending register fields will complicate register specifier routing and require the use of additional expensive routing and multiplexing circuitry. Turning to FIG. 13C, a result of extending a register file specification by using wide register specifiers on the routing of the instruction word bits during the instruction decode phase is indicated generally by the reference numeral 1360. In FIG. 13C, one of a 5 bit register specifier field and a 7 bit register field is extracted from the instruction word under the control of at least one of the opcode and the extended opcode. The extraction logic uses multiplexers to select from either a 5 bit field (extending unspecified bits with "0") or a 7 bit field, under the control of at least one of opcode and extended opcode (note that the opcode decoding logic, using as input at least one of opcode and extended opcode, and steering control signal of multiplexers not shown), to generate a 7 bit physical register specifier representing a fully extended internal register specifier.

In addition to logic complexity, the rearrangement of bits from the instruction word will lead to severe routing congestion during the decode phase, as the specifier bits for all operands have to be realigned and in accordance with the two concurrently supported register specification formats. The resulting routing congestion will lead to an increase in area, as well as impact the achievable microprocessor frequency.

Thus, what is needed is a novel improved encoding which will align the register specifier bits to minimize routing congestion and thereby lead to improved implementations of an extended register specification.

Figure 14A:
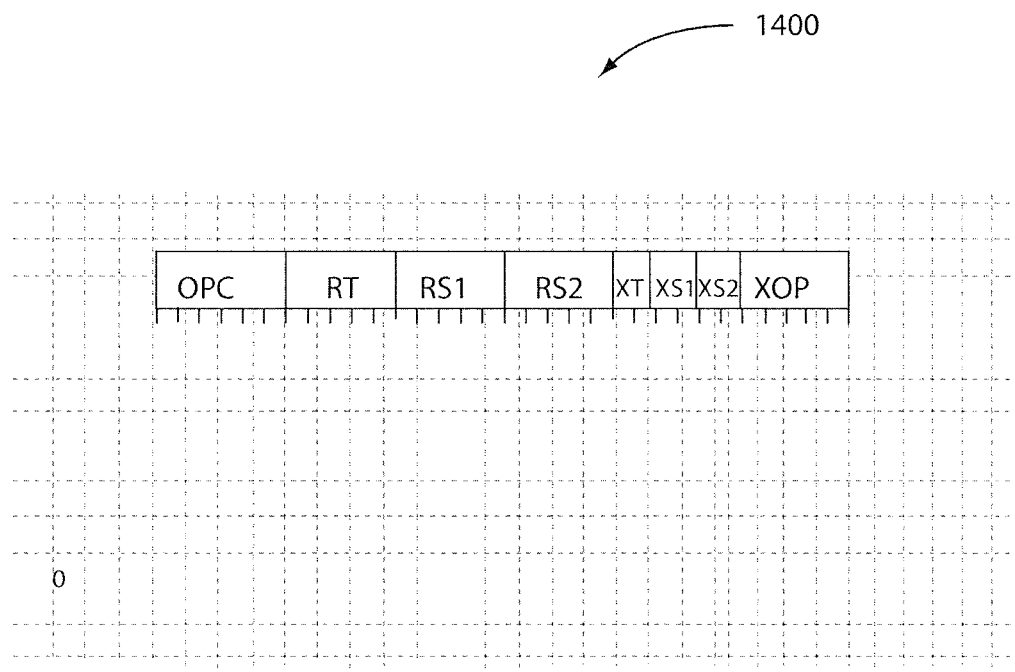
FIG. 14A is a diagram illustrating an improved encoding of 7 bit register specifiers using a method for encoding non-contiguous register specifiers in accordance with the present invention.

Turning to FIG. 14A, an improved encoding of 7 bit register specifiers using a method for encoding non-contiguous register specifiers is indicated generally by the reference numeral 1400. In accordance with the encoding 1400, a 7 bit register operand specifier is defined to include two non-contiguous register specifier fields. Thus, in one embodiment, a 7 bit target register specifier includes a 2 bit extended sub-specifier concatenated with a 5 bit sub-specifier. In a preferred embodiment, the 5 bit sub-specifier is aligned with the 5 bit specifier field of the original instruction set specification. Based on this encoding, one instruction set specification specifies instructions including the fields: OPC, opcode; RT, 5 bit register target sub-specifier (preferably aligned in its instruction encoding specification with legacy 5 bit target specifier); RS1, 5 bit register source 1 operands sub-specifier (preferably aligned in its instruction encoding specification with legacy 5 bit register source 1 specifier); RS2, 5 bit register source 2 operands sub-specifier (preferably aligned in its instruction encoding specification with legacy 5 bit register source 2 specifier); XT, 2 bit extended register target sub-specifier (preferably aligned in its instruction encoding specification with legacy 5 bit target specifier); XS1, 2 bit extended register source 1 operands sub-specifier (preferably aligned in its instruction encoding specification with legacy 5 bit register source 1 specifier); XS2, 2 bit extended register source 2 operands sub-specifier (preferably aligned in its instruction encoding specification with legacy 5 bit register source 2 specifier); and XOP, extended opcode.

Figure 14B:
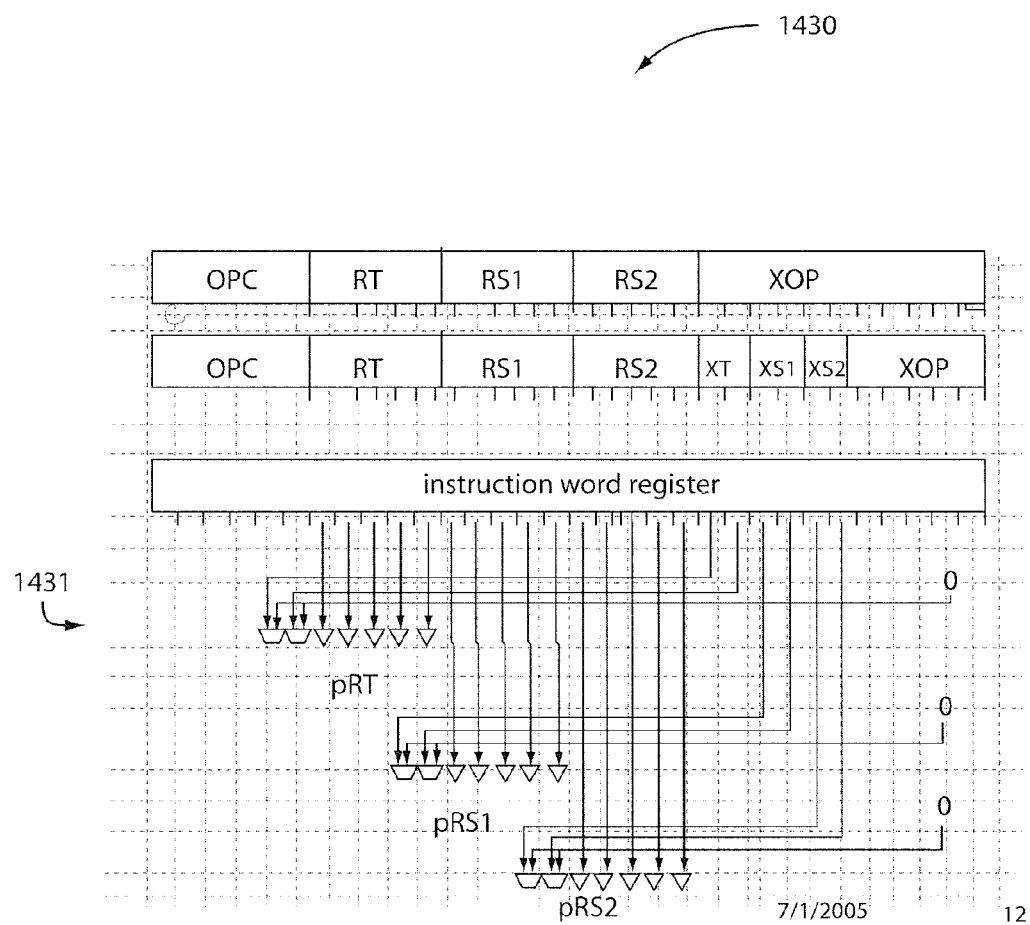
FIG. 14B is a diagram illustrating improved operand routing with an optimized register operand specifier definition in accordance with the present invention.

Turning to FIG. 14B, improved operand routing with a register operand specifier definition is indicated generally by the reference numeral 1430. The dataflow optimized register specifier extraction logic 1431 is enabled by an optimized extended register format specification that significantly reduces wiring congestion and, thus, leads to smaller area and higher performance implementations of a microprocessor implementing an extended register specification based on the use of non-contiguous register specifiers.

Referring now to FIGS. 15A-C, there are shown format specifications for the VMX128 specification. In accordance with the VMX128 specification, there are provided novel and improved instruction encodings, namely X2-Form 1500 (FIG. 1A), VA2-Form 1520 (FIG. 1B), and VX2-Form 1540 (FIG. 1C), providing instruction encodings supporting extended register specifier fields.

In FIG. 15A-C, the following instruction fields are used:
OPCD primary opcode
XO extended opcode
RA general purpose register specifier RA
RB general purpose register specifier RB
UIM unsigned immediate constant specifier
SIM signed immediate constant specifier
SHB immediate constant specifier
WMASK, MS, DT instruction control fields
Rc record-bit indicator
VA vector register specifier field
AX, AX0, AX1 (extended) vector register specifier field
VB vector register specifier field
VBX (extended) vector register specifier field
VC vector register specifier field
VCX (extended) vector register specifier field
VS vector register specifier field
VSX (extended) vector register specifier field
VT vector register specifier field
VTX (extended) vector register specifier field
/ unused field indicator (reserved for future use)

Referring now FIG. 15A, and more specifically, the encoding of the X2 instruction format, the X2 form 1500 offers two general purpose register slots, and a single vector source VS or vector target VT specifier for 128 registers encoded using a non-contiguous register specifier field in bit fields 6 to 10, and bits 28 and 29.

The X2 form 1500 is used for memory access, such as lvx128, stvx128, load vector element lvewx128, load vector element stvewx128, load and store vector left, load and store vector right, as well as variants thereof. The X2 form 1500 can optionally also be used to encode memory access-related instructions if such instructions are to be supported with an extended register specification.

Referring now to FIG. 15B, and more specifically, the encoding of the VA2 form 1520, there is shown a four vector register operand instruction form, having one 7 bit target register specifier, encoded using a non-contiguous register specifier field in bit fields 6 to 10, and bits 28 and 29, allowing to select one of 128 registers as target register, and three source register specifiers. A first and second register operand are specified as having 7 bit source register specifiers, to independently select one of 128 registers as each source operand register, and a third register specifier, using a 3 bit specifier, allowing to select one of 8 registers as third input operand.

According to the encoding shown in the VA2 form 1520, the three source operands are encoded as follows (using the symbol | to denote the concatenation operator for bit strings).

A first 7 bit register operand specifier VRA is formed by concatenating a first 1 bit field VAX0 (bit 21 of encoding 1522), a second 1 bit field VAX1 (bit 26 of encoding 1522), and a 5 bit specifier field VA (bits 11 to 15 of encoding 1522), to form an extended specifier VRA=VAX0|VAX1|VA.

A second 7 bit register operand specifier VRB is formed by concatenating a two bit specifier field VBX (bits 30 and 31 of encoding 1522) with a 5 bit specifier field VB (bits 16-20 of encoding 1522), to form an extended specifier VRB=VBX|VB.

A third register operand specifier VRC is extracted from 3 bit field VC wherein the specifier bits of the 3 bit VC field (bits 23 to 25 of encoding 1522) are advantageously aligned with the low-order 3 bits of specifier VC of encoding form 531 (representing the VMX VA encoding format) of FIG. 5B in accordance with the VMX specification. In accordance with the extended register specification, to allow the VRC operand to address one of vector registers 0 to 7, the extended specifier VRC is created by concatenating with a string of "0000" using the logic equation VRC="0000" |VC.

In accordance with the VMX128 specification, encoding form 1520 is used to encode a vperm128 instruction, specifying one of 128 register targets for a permuted result, two of 128 vector registers providing the vector data to be permuted, and one of 8 registers to specify the permutation control word.

According to FIG. 15B, there is also specified an encoding form 1524 with a 7 bit vector register target, two independent 7 bit vector register source operands, and a 4 bit immediate field (bits 22 to 25 denoted "SHB" in encoding 124), to encode shift operations operating on the concatenation of two vector registers, such as the vsldoi128 instruction.

Referring now to FIG. 15C, there are shown variants of the VX2 encoding form 1540. The VX2 encoding form 1540 is used to provide the generalized VMX2 operation repertoire using 3 non-contiguous register specifiers, to specify a single 7 bit target register specifier, and two 7 bit source operand register specifiers.

According to the encoding form 1540, the three source operands are encoded as follows (using the symbol | to denote the concatenation operator for bit strings).

A 7 bit target register specifier is encoded using a non-contiguous register specifier field in bit fields 6 to 10, and bits 28 and 29, allowing for the selection of one of 128 registers as a target register.

A first 7 bit source register operand specifier VRA is formed by concatenating a first 1 bit field VAX0 (bit 21 of encoding 1541]), a second 1 bit field VAX1 (bit 26 of encoding 1541), and a 5 bit specifier field VA (bits 11 to 15 of encoding 1541), to form an extended specifier VRA=VAX0|VAX1|VA.

A second 7 bit register operand specifier VRB is formed by concatenating a two bit specifier field VBX (bits 30 and 31 of encoding 1541) with a 5 bit specifier field VB (bits 16-20 of encoding 1541), to form an extended specifier VRB=VBX|VB. In accordance with encoding 1541, the second specifier is labeled VCX for consistency with other instructions used in the VMX instruction set.

In accordance with the VMX2 specification, at least one register source operand may optionally be replaced by an immediate field (SIM (1545), UIM (1546, 1547, 1548), WMASK (1549), DT (1550), MS (1550), SHW (1549), UIX (1552), respectively), an extended opcode specification (X0), or an un-decoded reserved field (denoted with the "/" symbol).

In accordance with another aspect of this embodiment, the VTX specifier may specify both a target and a source operand, for instructions that update one of their source operands, such as the vector multiply-and-accumulate vmaddfp128, and similar operations. In addition to multiply-and-accumulate instructions, there are also provided non-accumulating vector multiply instructions.

Referring now to the encoding of the first source register operand VRA, the first operand is encoded using three non-contiguous fields to ensure proper non-interference with pre-existing opcode fields, and allow an optimized allocation of the instruction opcode subspaces to the novel encoding forms. In accordance, with the optimization of non-interference, specifier fields are selected that allow a maximum number of extended opcodes to be allocated to a format.

While the methods set forth herein allow the efficient encoding of an extended register set, opcode space is restricted in 32 bit fixed width instruction sets, and the cost of encoding space consumed by a single 3-operand operation encoded in an instruction with three 7 bit register specifiers to independently address 128 registers, is represented by an encoding point consumption which is $2^{(3 \times 2)}=64$ times as expensive as the same operation encoded in an instruction with three 5 bit specifiers independently addressing 32 registers each. Thus, while it may appear desirable to extend the entire repertoire of operations, a careful selection has to be made.

Thus, an extended specification may have constraints on register operand usage, wherein some operations can be used in instructions with the entire set of 128 registers as their operands, while other operations may only be used in their original instruction form supporting the complete set of 32 registers vr0 to vr31. In one embodiment, the original instruction forms for addressing the complete set of 32 registers are always available for all operation forms, to ensure binary compatibility at the architecture level.

In addition, additional constraints are imposed on operation forms requiring 4 operands. In accordance with the encoding of operations in VMX2 instructions, the 4 operand vperm128 instruction is encoded in an instruction format 1520 providing three 7 bit specifiers for the target and the input permute data operands, and a single three bit specifier for the permute control word register, allowing the permute control word to reside in one of vector registers vr0 to vr7, as shown in FIG. 9.

In another aspect of implementation, an update form is provided for operation forms such as fused-multiply-add, resulting in instruction forms implementing, e.g., vector-multiply-and-accumulate semantics that are frequently used in code such as the BLAS routines (e.g., in matrix multiply operations).

Referring now to yet other instruction encodings of operations, a vsel128 instruction will overwrite the select control word with its result, which is consistent with its use in selecting data sources in code operating on if-converted vector data.

Turning to FIGS. 16A-D, alternate encodings of an instruction set with an extended register specification are indicated by the reference numerals 1600, 1620, 1640, and 1660, respectively. The alternate encodings correspond to an extended register specification supporting 6 bit specifiers to independently address one of 64 registers in a fixed width instruction word. Those skilled in the art will understand that other extended register specifications extensions can be defined based upon the concepts, strategies and principles outlined herein. Having reduced the cost of encoding an operation by using instructions with only 6 bit register specifiers, more operations can be supported by such an exemplary encoding.

Having thus described an extended register specification for an industry standard instruction set, what is needed is a method for automatically generating code for an instruction set with an extended register specification. In another aspect of automatic code generation, the methods used for such code generation should lend themselves to efficient implementation and fast execution speeds.

Thus, what is needed are code generation methods in accordance with the described extended register specification for an instruction set, as follows.

A first set of operations is provided in an instruction encoding with an orthogonal 32 register operand set.

A second operation set is provided in an instruction encoding with an orthogonal 128 register operand set, wherein optionally the second set of operations is substantially a subset of the first set of operations, or wherein optionally the first and second sets are not disjoint.

A third set of operations is provided in an instruction encoding with an orthogonal 128 register operand set, wherein at least one operand serves both as input and output of the operations, and wherein the third set of operations is also available in the first set of operations having an instruction encoding specifying 32 registers and wherein the input and output registers can be independently specified.

A fourth set of operations is provided in an instruction encoding wherein a first set of operands can be specified from the 128 register operand set, and at least one operand has to be from a small subset of registers (but preferably more than at least two registers) available in the architecture.

In at least one embodiment, the number of registers in the extended specification is more than twice the number of registers in the subset.

In a preferred embodiment, registers spilled from a register class are first spilled to a less restricted register class. In one optimized embodiment, spilling is performed to a hierarchically encompassing register class when a register cannot be allocated to its preferred register class. In another optimized embodiment, a sequence of a first spill to less restrictive register class, and a subsequence spill to one of another second register class or memory are coalesced into a single spill operation to the second register class or memory.

Figure 17A:
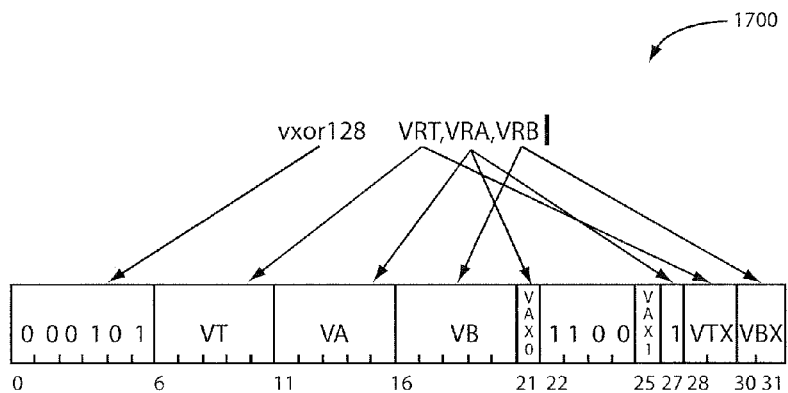
FIGS. 17A and 17B are diagrams illustrating encoding steps of instructions referencing an extended register specification into improved encodings using non-contiguous register specifiers, in accordance with the present invention.

Turning to FIG. 17A, register specifiers encoded into non-contiguous register file specifier fields are indicated generally by the reference numeral 1700. In FIG. 17A, the encoded register specifiers are separated by at least one bit not part of the register specifier of a fixed width instruction word. In accordance with this instruction encoding, the operation specification (vxor128) is encoded using one or more bit fields (bit fields 0 to 5 indicated, 22 to 25 and bit 27 in one exemplary encoding).

Figure 17B:
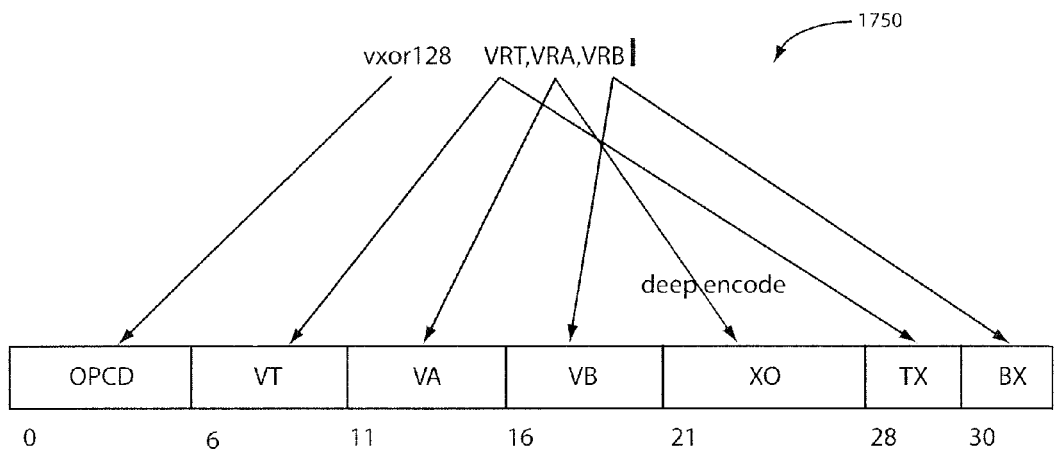

An alternate embodiment is shown in FIG. 17B. Turning to FIG. 17B, register specifiers encoded into non-contiguous register file specifier fields are indicated generally by the reference numeral 1750. In FIG. 17B, at least one operand is encoded into at a least a first register specifier field including a direct bit field, and a second "deep encoding" field (such as including but not limited to an X0 extended operation code field), wherein one or more additional specifier bits are only obtained after a full decode of the field. In accordance with this instruction encoding, the operation is encoded using one or more bit fields, at least one of the bit fields having multiple code points assigned to the same operation, and the selection of a first or a second code point indicating at least one bit of information for a non-contiguous register specifier ("deep encoding"). In the exemplary figure, the vxor128 operation is encoded by a first opcode field (bits 0 to 5) and a second deeply encoded field (X0 field in bits 21 to 27), the deeply encoded X0 field serving to encode both 2 bits of a VRA extended register specifier and the specific operation, by allocation 4 code points to the vxor operation, the choice of the four code points indicating bits two specifier bits corresponding to "00", "01", "10" and "11", respectively.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for generating code for a fixed-width instruction set, comprising:
   identifying a non-contiguous register specifier that includes at least two sets of contiguous bits separated by at least one bit not part of the register specifier;
   encoding a single logical register specifier into at least two non-contiguous fields of the non-contiguous register specifier, wherein the single logical register specifier is represented using a generic intrinsic that provides no indication of a partitioning of an operand specification into the non-contiguous register specifier; and
   generating a fixed-width instruction word that includes the non-contiguous register specifier.

2. The method of claim 1, wherein a first set of bits in the non-contiguous register specifier is specified directly by an instruction field in the fixed-width instruction, and a second set of bits in the non-contiguous register specifier is specified directly by another instruction field in the fixed-width instruction.

3. The method of claim 1, wherein a first set of bits in the non-contiguous register specifier is specified directly by an instruction field in the fixed-width instruction, a second set of bits in the non-contiguous register specifier is specified using a deep encoding, and the method further comprises generating a set of n bits for inclusion as part of the non-contiguous register specifier from a set of m bits encoded in the fixed-width instruction, wherein n is less than in, and the deep encoding involves allocating multiple opcode points or extended opcode points to indicate the fixed-width instruction, wherein each of the opcode points or the extended opcode points further indicates the use of a specific bit string as an extended register specifier.

4. The method of claim 1, further comprising:
   generating a first set of fixed-width instructions that allow referencing of a first set of registers with a contiguous register specifier; and
   generating a second set of fixed-width instructions that allow referencing of a second set of registers using the non-contiguous register specifier, the second set of registers being larger than the first set of registers.

5. The method of claim 4, wherein the second set of registers includes at least a subset of the first set of registers, the at least subset of the first set of registers being encoded by the second set of fixed-width instructions.

6. The method of claim 5, further comprising generating the second set of fixed-width instructions using a compiling method for an extended register specification, the compiling method comprising allocating a first set of operands to the first set of registers, and allocating a second set of operands to the second set of registers, said allocating steps performed in accordance with an instruction set specification corresponding to the fixed-width instruction set.

7. A computer program product comprising a non-transitory computer usable medium having computer usable program code for generating code for a fixed-width instruction set, said computer program product comprising:
   computer usable program code for identifying a non-contiguous register specifier that includes at least two sets of contiguous bits separated by at least one bit not part of the register specifier;
   computer usable program code for encoding a single logical register specifier into at least two non-contiguous fields of the non-contiguous register specifier, wherein the single logical register specifier is represented using a generic intrinsic that provides no indication of a partitioning of an operand specification into the non-contiguous register specifier; and
   computer usable program code for generating a fixed-width instruction word that includes the non-contiguous register specifier.

8. The computer program product of claim of claim 7, wherein a first set of bits in the non-contiguous register specifier is specified directly by an instruction field in the fixed-width instruction, and a second set of bits in the non-contiguous register specifier is specified directly by another instruction field in the fixed-width instruction.

9. The computer program product of claim of claim 7, wherein a first set of bits in the non-contiguous register specifier is specified directly by an instruction field in the fixed-width instruction, a second set of bits in the non-contiguous register specifier is specified using a deep encoding, and the computer program product further comprises computer usable program code for generating a set of n bits for inclusion as part of the non-contiguous register specifier from a set of m bits encoded in the fixed-width instruction, wherein n is less than m, and the deep encoding involves allocating multiple opcode points or extended opcode points to indicate the fixed-width instruction, wherein each of the opcode points or the extended opcode points further indicates the use of a specific bit string as an extended register specifier.

* * * * *